United States Patent
Onzon et al.

(10) Patent No.: US 10,417,749 B2
(45) Date of Patent: Sep. 17, 2019

(54) METHOD AND SYSTEM FOR EDGE DENOISING OF A DIGITAL IMAGE

(71) Applicant: ALGOLUX INC., Montreal (CA)

(72) Inventors: Emmanuel Luc Julien Onzon, Montreal (CA); Nicolas Joseph Paul Robidoux, Montreal (CA)

(73) Assignee: ALGOLUX INC., Montreal (CA)

( * ) Notice: Subject to any disclaimer, the term of this patent is extended or adjusted under 35 U.S.C. 154(b) by 0 days.

(21) Appl. No.: 16/261,821

(22) Filed: Jan. 30, 2019

(65) Prior Publication Data
US 2019/0172182 A1    Jun. 6, 2019

Related U.S. Application Data

(63) Continuation-in-part of application No. 15/466,639, filed on Mar. 22, 2017, now Pat. No. 10,223,772.

(60) Provisional application No. 62/311,612, filed on Mar. 22, 2016.

(51) Int. Cl.
*G06T 5/00*  (2006.01)
*G06T 3/40*  (2006.01)
*G06T 5/10*  (2006.01)

(52) U.S. Cl.
CPC ............... *G06T 5/002* (2013.01); *G06T 5/10* (2013.01)

(58) Field of Classification Search
CPC ............. G06T 5/002; G06T 3/4015; G06T 2207/20021; G06T 2207/20028
See application file for complete search history.

(56) References Cited

U.S. PATENT DOCUMENTS

| | | | | |
|---|---|---|---|---|
| 7,418,130 B2 * | 8/2008 | Keshet | ......... | G06T 3/4015 348/E9.003 |
| 7,498,961 B2 * | 3/2009 | Weissman | ......... | G10L 21/0208 341/107 |
| 8,237,825 B2 * | 8/2012 | Wright | ......... | H04N 5/3675 348/246 |
| 8,335,394 B2 * | 12/2012 | Zhu | ......... | G06T 5/003 382/181 |
| 9,122,960 B2 | 9/2015 | Lin et al. | | |
| 9,251,569 B2 | 2/2016 | Hsieh et al. | | |
| 9,330,442 B2 | 5/2016 | Kang | | |
| 9,569,822 B2 | 2/2017 | Hsieh et al. | | |

(Continued)

OTHER PUBLICATIONS

"Fast High-Dimensional Filtering Using the Permutohedral Lattice", Andrew Adams, Jongmin Baek, Myers, Abraham Davis, In Computer Graphics Forum (Proc. Eurographics), 2010.

(Continued)

*Primary Examiner* — Bobbak Safaipour
(74) *Attorney, Agent, or Firm* — IP-MEX Inc.; Victoria Donnelly

(57) ABSTRACT

Method and system for denoising an edge in a raw digital image are described. First, a direction of a normal to the edge near a pixel p is determined, and neighboring pixels are projected to the normal to the edge, forming projected pixels. Then weighted intensities of the neighboring pixels are determined, including set of weights. One dimensional Gaussian filter centered on the pixel p and acting on the projected pixels is applied, and intensities of the neighboring pixels are adjusted according to the set of weights, resulting in a denoised value z of the pixel p using the weighted intensities, thereby denoising the edge of the raw image expediently.

23 Claims, 26 Drawing Sheets

(56) References Cited

U.S. PATENT DOCUMENTS

| | | | | |
|---|---|---|---|---|
| 10,223,772 | B2* | 3/2019 | Onzon | G06T 5/002 |
| 10,249,026 | B2* | 4/2019 | Csefalvay | G06T 5/002 |
| 2011/0187902 | A1* | 8/2011 | Adams, Jr. | G06T 5/002 |
| | | | | 348/241 |
| 2011/0188748 | A1* | 8/2011 | Adams, Jr. | H04N 9/045 |
| | | | | 382/167 |
| 2012/0281923 | A1 | 11/2012 | Irani et al. | |
| 2014/0153817 | A1 | 6/2014 | Lin et al. | |
| 2015/0071561 | A1 | 3/2015 | Hsieh et al. | |
| 2016/0117805 | A1 | 4/2016 | Hsieh et al. | |
| 2016/0253787 | A1* | 9/2016 | Chen | G06T 5/002 |
| | | | | 382/275 |

OTHER PUBLICATIONS

"Gaussian KD-Trees for Fast High-Dimensional Filtering", Andrew Adams, Natasha Gelfand, Jennifer Dolson, Marc Levoy. In ACM Transactions on Graphics (Proc. Siggraph 09).

"A review of image denoising algorithms, with a new one", Antoni Buades, Bartomeu Coll, Jean-Michel Morel, SIAM Journal on Multiscale Modeling and Simulation: A SIAM Interdisciplinary Journal, 2005, 4 (2), pp. 490-530.

"A Novel Technique for Reducing Demosaicing Artifacts", Daniele Menon, Stefano Andriani, Giancarlo Calvagno. Prc. of the 14th European Signal Processing Conference (Eusipco), Sep. 2006.

"Flash Photography Enhancement via Intrinsic Relighting", Elmar Eisemann, Fredo Durand, ACM Trans. on Graphics, vil. 23, No. 3, pp. 673-678, Aug. 2004.

"Domain Transform for Edge-Aware Image and Video Processing", Eduardo S. L. Gastal, Manuel M. Oliveira. ACM TOG 30, 4 (2011) 69:1-69:12.

"Digital Photography with Flash and No-Flash Image Pairs", Georg Petschnigg, Richard Szeliski, Manees Agrawala, Michael Cohen, Hugues Hoppe, Kentaro Toyama, ACM Trans, on Graphics, vol. 23, No. 3, pp. 664-672, Aug. 2004.

"Real-time Edge-Aware Image Processing with the Bilateral Grid", Jiawen Chen, Sylvain Paris, Fredo Durand. In ACM Transactions on Graphics (Proc. Siggraph 07), p. 103, 2007.

"Rapid Object Detection using a Boosted Cascade of Simple Features", Paul Viola, Michael Jones, Conference on computer vision and pattern recognition, 2001.

"Bilateral Filtering: Theory and Applications", Sylvain Paris, Pierre Kornprobst, Jack Tumblin, Fredo Durand, Foundations and Trends in Computer Graphics and Vision, vol. 4, No. 1, pp. 1-73, 2009.

"Image Demosaicing: A Systematic Survey", Xin Li, Bahadir Gunturk, Lei Zhang, Proc. SPIE 6822, Visual Communications and Image Processing 2008.

"Adaptive manifolds for real-time high-dimensional filtering". ACM TOG 31, 4(2012), 33:1-33:13. Proceedings of SIGGRAPH 2012.

"Anscombe transform" which is published on-line by Wikipedia, https://en.wikipedia.org/w/index.php?title=Anscombe_transform &oldid=542474308, dated Mar. 7, 2016.

"Demosaicing", which is published on-line by Wikipedia, https://en.wikipedia.org/w/index.php?title=Demosaicing&oldid= 698668356, dated Jan. 7, 2016.

"Summed area table", which is published on-line by Wikipedia, https://en.wikipedia.org/w/index.php?title=Summed_area_table &oldid=705056397, dated Feb. 15, 2016.

"Bayer filter", which is published on-line by Wikipedia, https://en.wikipedia.org/w/index.php?title=Bayer_filter&oldid=706429574, dated Feb. 23, 2016.

"Bilateral Filter", which is published on-line by Wikipedia, https://en.wikipedia.org/w/index.php?title=Bilateral_filter&oldid= 709887363, dated Mar. 13, 2016.

"Raw image format", which is published on-line by Wikipedia, https://en.wikipedia.org/w/index.php?title=Raw_image_format&oldid= 711143770, dated Mar. 21, 2016.

"Non-local Means", which is published on-line by Wikipedia, https://en.wikipedia.org/w/index.php?title=Non-local_means&oldid= 709366809, dated Mar. 10, 2016.

* cited by examiner

| R  | G1    | R     | G1    | R  | G1   | R     | G1    |
|----|-------|-------|-------|----|------|-------|-------|
| G2 | B p1  | G2 p2 | B p3  | G2 | B    | G2    | B     |
| R  | G1 p4 | R p   | G1 p5 | R  | G1   | R     | G1    |
| G2 | B p6  | G2 p7 | B p8  | G2 | B q1 | G2 q2 | B q3  |
| R  | G1    | R     | G1    | R  | G1 q4| R q   | G1 q5 |
| G2 | B     | G2    | B     | G2 | B q6 | G2 q7 | B q8  |

FIG. 3A1

| R | G1 | R | G1 | R | G1 | R | G1 |
|---|---|---|---|---|---|---|---|
| G2 | B p1 | G2 p2 | B p3 | G2 | B | G2 | B |
| R | G1 p4 | R p | G1 p5 | R | G1 | R | G1 |
| G2 | B p6 | G2 p7 | B p8 | G2 | B q1 | G2 q2 | B q3 |
| R | G1 | R | G1 | R | G1 q4 | R q | G1 q5 |
| G2 | B | G2 | B | G2 | B q6 | G2 q7 | B q8 |

FIG. 3C1

| R | G1 | R | G1 | R | G1 | R | G1 |
|---|---|---|---|---|---|---|---|
| G2 | B p1 | G2 p2 | B p3 | G2 | B | G2 | B |
| R | G1 p4 | R p | G1 p5 | R | G1 | R | G1 |
| G2 | B p6 | G2 p7 | B p8 | G2 | B q1 | G2 q2 | B q3 |
| R | G1 | R | G1 | R | G1 q4 | R q | G1 q5 |
| G2 | B | G2 | B | G2 | B q6 | G2 q7 | B q8 |

FIG. 3C2

| R  | G1   | R     | G1   | R  | G1    | R     | G1    |
|----|------|-------|------|----|-------|-------|-------|
| G2 | B p1 | G2 p2 | B p3 | G2 | B     | G2    | B     |
| R  | G1 p4| R p   | G1 p5| R  | G1    | R     | G1    |
| G2 | B p6 | G2 p7 | B p8 | G2 | B q1  | G2 q2 | B q3  |
| R  | G1   | R     | G1   | R  | G1 q4 | R q   | G1 q5 |
| G2 | B    | G2    | B    | G2 | B q6  | G2 q7 | B q8  |

FIG. 3C3

| R | G1 | R | G1 | R | G1 | R | G1 |
|---|---|---|---|---|---|---|---|
| G2 | B p1 | G2 p2 | B p3 | G2 | B | G2 | B |
| R | G1 p4 | R p | G1 p5 | R | G1 | R | G1 |
| G2 | B p6 | G2 p7 | B p8 | G2 | B q1 | G2 q2 | B q3 |
| R | G1 | R | G1 | R | G1 q4 | R q | G1 q5 |
| G2 | B | G2 | B | G2 | B q6 | G2 q7 | B q8 |

FIG. 3C4

| p1 | p2 | p3 |
|----|----|----|
| p4 | p  | p5 |
| p6 | p7 | p8 |

FIG. 5A1

| p1 | p2 | p3 |
|----|----|----|
| p4 | p  | p5 |
| p6 | p7 | p8 |

FIG. 5A2

| p1 | p2 | p3 |
|----|----|----|
| p4 | p  | p5 |
| p6 | p7 | p8 |

FIG. 5A3

| p1 | p2 | p3 |
|----|----|----|
| p4 | p  | p5 |
| p6 | p7 | p8 |

FIG. 5A4

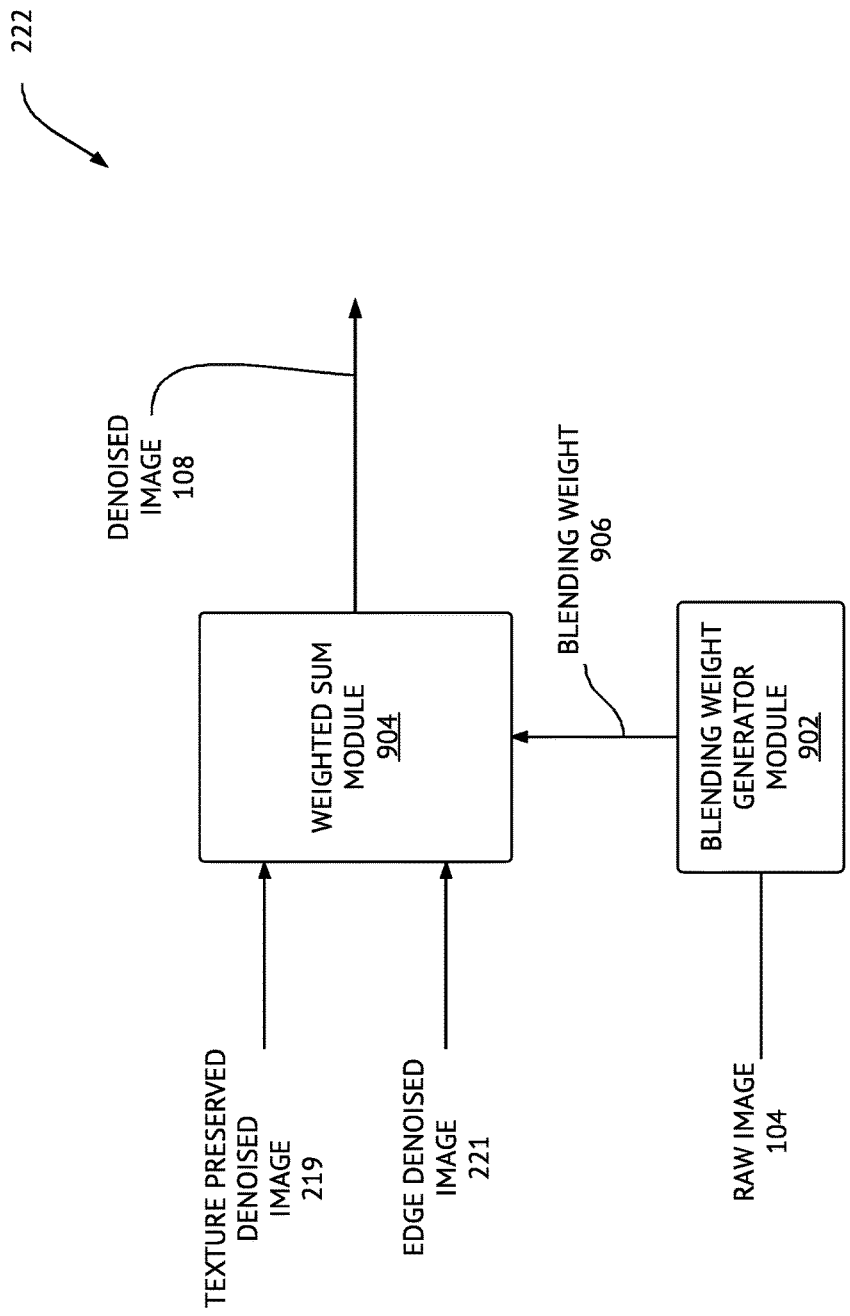

METHOD AND SYSTEM FOR EDGE DENOISING OF A DIGITAL IMAGE

CROSS-REFERENCE TO RELATED APPLICATIONS

The present application is a Continuation-in-Part (CIP) of U.S. patent application Ser. No. 15/466,639 for METHOD AND SYSTEM FOR DENOISING AND DEMOSAICING ARTIFACT SUPPRESSION IN DIGITAL IMAGES" filed on Mar. 22, 2017, which claims priority from U.S. Provisional Patent Application Ser. No. 62/311,612 filed on Mar. 22, 2016, the entire contents of which are incorporated herein by reference.

FIELD OF THE INVENTION

The present invention generally relates to image processing of raw digital images, and in particular to a method and system for denoising and blurring parts of digital images.

BACKGROUND OF THE INVENTION

Digital images may become noisy during acquisition or transmission, resulting in the reduced quality of the digital images.

Reducing the noise, or denoising, of the digital image still remains a challenge, because noise reduction introduces artifacts and causes blurring of digital images.

There are various existing denoising techniques, each having its assumptions, advantages, and limitations, and being suitable to particular noise model.

Accordingly, there is a need in the industry for developing an alternative method and system for denoising digital images, which would mitigate or avoid at least some shortcomings of the prior art.

Also, because digital images are acquired by an image sensor overlaid with a color filter array (CFA), for example a Bayer's filter, a demosaicing process is needed to remove demosaic artifacts resulting from the CFA structure of sensors, to render the digital images into a viewable format. Demosaicing process is also known as CFA interpolation or color reconstruction. Modern digital cameras can save digital images in a raw format to obtain raw images, allowing users to demosaic raw images using software, instead of using a firmware built-in the digital camera.

Usually, demosaicing methods cause several artifacts such as zipper effect and color artifact which are easily seen around edges and densely textured regions, and typically new demosaicing methods are proposed to remove or mitigate these artifacts. A survey in "Image Demosaicing: A Systematic Survey," X. Li, B. Gunturk, L. Zhang., Proc. SPIE 6822, Visual Communications and Image Processing 2008, provides a review of demosaicing methods.

Accordingly, there is a need in the industry for developing an alternative method and system for suppressing artifacts in digital images introduced by existing demosaicing methods, which would mitigate or avoid at least the shortcomings of the prior art.

SUMMARY OF THE INVENTION

There is an object of the present invention to provide an improved method and system for denoising and blending of parts of digital images, which would mitigate or avoid at least some disadvantages of the prior art.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

According to one aspect of the invention, there is provided a method of denoising an edge in a raw image, the edge comprising a pixel p, the method comprising: employing a hardware processor 110 for: (a) determining a direction of a normal to the edge near the pixel p; (b) determining neighboring pixels in a neighborhood of the pixel p; (c) projecting the neighboring pixels to the normal to the edge, forming projected pixels; (d) determining weighted intensities of the neighboring pixels, comprising: (i) determining a set of weights, comprising applying a one dimensional, 1D, Gaussian filter centered on the pixel p and acting on the projected pixels; and (ii) adjusting intensities of the neighboring pixels according to the set of weights; and (e) determining a denoised value z of the pixel p using the weighted intensities; thereby denoising the edge of the raw image expediently.

The method described above further comprises replacing the pixel p with respective first shifted pixel p+ at a first distance from the pixel p along the normal to the edge, on a brighter side of the edge, and a second shifted pixel p− at a second distance from the pixel p along the normal to the edge, on a darker side of the edge; applying the steps (b) to (e) to the respective pixels p+ and p− to determine a first shifted denoised value $z_+$ and a second shifted denoised value $z_-$; determining a second order derivative $\Delta$ along the normal to the edge, based on the first and second shifted denoised values $z_-$ and $z_+$ and a distance between the pixels $p_+$ and $p_-$; determining a sharpened edge denoised value $z_{sharp}$ of the pixel p, comprising adjusting the denoised value z proportionately to the second order derivative $\Delta$.

In the method described above, the first distance from the pixel p and the second distance from the pixel p are substantially equal.

In the method described above, a sharpened edge denoised value $z_{sharp}$ is determined as $z_{sharp} = z + s\Delta$, wherein "s" is a predefined strength of sharpening.

In the method described above, "s" is about 0.6.

In the method described above, the determining the direction of the normal to the edge further comprises: applying a set of linear filters $K_x$, $K_y$, $K_z$, and $K_w$ to the raw image, the filters being balanced, resulting in a set of filtered images $d_x$, $d_y$, $d_z$, $d_w$, respectively; generating a set of estimates of the normal to the edge, based on the set of respective filtered images $d_x$, $d_y$, $d_z$, $d_w$; and generating the normal to the edge using the set of filtered images.

In the method described above, the applying further comprises choosing a size of each linear filters from about 3 to about 9.

In the method described above, the applying comprises applying the set of linear filters $K_x$, $K_y$, $K_z$, $K_w$ as follows:

$$K_x = \begin{bmatrix} -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & 0 & -1 & 0 & 0 & 0 & 1 & 0 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \end{bmatrix}$$

$$K_y = \begin{bmatrix} -1 & -1 & -1 & -1 & -1 & -1 & -1 & -1 & -1 \\ -1 & -1 & -1 & -1 & 0 & -1 & -1 & -1 & -1 \\ -1 & -1 & -1 & -1 & -1 & -1 & -1 & -1 & -1 \\ -1 & -1 & -1 & -1 & 0 & -1 & -1 & -1 & -1 \\ 0 & 0 & 0 & 0 & 0 & 0 & 0 & 0 & 0 \\ 1 & 1 & 1 & 1 & 0 & 1 & 1 & 1 & 1 \\ 1 & 1 & 1 & 1 & 1 & 1 & 1 & 1 & 1 \\ 1 & 1 & 1 & 1 & 0 & 1 & 1 & 1 & 1 \\ 1 & 1 & 1 & 1 & 1 & 1 & 1 & 1 & 1 \end{bmatrix}$$

$$K_z = \begin{bmatrix} 0 & 1 & 1 & 1 & 1 & 1 & 1 & 1 & 1 \\ -1 & 0 & 1 & 1 & 1 & 1 & 1 & 1 & 1 \\ -1 & -1 & 0 & 1 & 1 & 1 & 1 & 1 & 1 \\ -1 & -1 & -1 & 0 & 1 & 1 & 1 & 1 & 1 \\ -1 & -1 & -1 & -1 & 0 & 1 & 1 & 1 & 1 \\ -1 & -1 & -1 & -1 & -1 & 0 & 1 & 1 & 1 \\ -1 & -1 & -1 & -1 & -1 & -1 & 0 & 1 & 1 \\ -1 & -1 & -1 & -1 & -1 & -1 & -1 & 0 & 1 \\ -1 & -1 & -1 & -1 & -1 & -1 & -1 & -1 & 0 \end{bmatrix}$$

$$K_w = \begin{bmatrix} -1 & -1 & -1 & -1 & -1 & -1 & -1 & -1 & 0 \\ -1 & -1 & -1 & -1 & -1 & -1 & -1 & 0 & 1 \\ -1 & -1 & -1 & -1 & -1 & -1 & 0 & 1 & 1 \\ -1 & -1 & -1 & -1 & -1 & 0 & 1 & 1 & 1 \\ -1 & -1 & -1 & -1 & 0 & 1 & 1 & 1 & 1 \\ -1 & -1 & -1 & 0 & 1 & 1 & 1 & 1 & 1 \\ -1 & -1 & 0 & 1 & 1 & 1 & 1 & 1 & 1 \\ -1 & 0 & 1 & 1 & 1 & 1 & 1 & 1 & 1 \\ 0 & 1 & 1 & 1 & 1 & 1 & 1 & 1 & 1 \end{bmatrix}$$

The method described above further comprises selecting the neighborhood of the pixel p having a rectangular shape.

The method described above further comprises choosing a standard deviation for the 1D Gaussian filter from about 1.5 to about 2.

According to another aspect of the invention, there is provided a system for denoising an edge in a raw image, the edge comprising a pixel p, the system comprising: a memory device having computer readable instructions stored thereon for execution by a processor, causing the processor to: (a) determine a direction of a normal to the edge; (b) determine neighboring pixels in a neighborhood of the pixel p; (c) project the neighboring pixels to the normal to the edge, forming projected pixels; (d) determine weighted intensities of the neighboring pixels, comprising: (i) determining a set of weights, comprising applying a one dimensional, 1D, Gaussian filter centered on the pixel p and acting on the projected pixels; and (ii) adjusting intensities of the neighboring pixels according to the set of weights; and (e) determine a denoised value z of the pixel p using the weighted intensities; thereby denoising the edge of the raw image expediently.

In the system described above, the computer readable instructions further cause the processor to: replace the pixel p with respective first shifted pixel $p_+$ at a first distance from the pixel p along the normal to the edge, on a brighter side of the edge, and a second shifted pixel $p_-$ at a second distance from the pixel p along the normal to the edge, on a darker side of the edge; apply the steps (b) to (e) to the respective pixels $p_+$ and $p_-$ to determine a first shifted denoised value $z_+$ and a second shifted denoised value $z_-$; determine a second order derivative $\Delta$ along the normal to the edge, based on the first and second shifted denoised values $z_-$ and $z_+$ and a distance between the pixels $p_+$ and $p_-$; determine a sharpened edge denoised value $z_{sharp}$ of the pixel p, comprising adjusting the denoised value z proportionately to the second order derivative $\Delta$.

In the system described above, the first distance from the pixel p and the second distance from the pixel p are substantially equal.

In the system described above, the computer readable instructions further cause the processor to determine a sharpened edge denoised value as: $z_{sharp} = z + s\Delta$, wherein "s" is a predefined strength of sharpening.

In the system described above, "s" is about 0.6.

In the system described above, the computer readable instructions for determining the direction of the normal to the edge, further cause the processor to: apply a set of linear filters $K_x$, $K_y$, $K_z$, and $K_w$ to the raw image, the filters being balanced, resulting in a set of filtered images $d_x$, $d_y$, $d_z$, $d_w$, respectively; generate a set of estimates of the normal to the edge, based on the set of respective filtered images $d_x$, $d_y$, $d_z$, $d_w$; and generate the normal to the edge using the set of filtered images.

In the system of described above, a size of each linear filters is from about 3 to about 9.

In the system described above, the set of linear filters $K_x$, $K_y$, $K_z$, $K_w$ are as follows:

$$K_x = \begin{bmatrix} -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & 0 & -1 & 0 & 0 & 0 & 1 & 0 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \end{bmatrix}$$

$$K_y = \begin{bmatrix} -1 & -1 & -1 & -1 & -1 & -1 & -1 & -1 & -1 \\ -1 & -1 & -1 & -1 & 0 & -1 & -1 & -1 & -1 \\ -1 & -1 & -1 & -1 & -1 & -1 & -1 & -1 & -1 \\ -1 & -1 & -1 & -1 & 0 & -1 & -1 & -1 & -1 \\ 0 & 0 & 0 & 0 & 0 & 0 & 0 & 0 & 0 \\ 1 & 1 & 1 & 1 & 0 & 1 & 1 & 1 & 1 \\ 1 & 1 & 1 & 1 & 1 & 1 & 1 & 1 & 1 \\ 1 & 1 & 1 & 1 & 0 & 1 & 1 & 1 & 1 \\ 1 & 1 & 1 & 1 & 1 & 1 & 1 & 1 & 1 \end{bmatrix}$$

-continued $$K_z = \begin{bmatrix} 0 & 1 & 1 & 1 & 1 & 1 & 1 & 1 & 1 \\ -1 & 0 & 1 & 1 & 1 & 1 & 1 & 1 & 1 \\ -1 & -1 & 0 & 1 & 1 & 1 & 1 & 1 & 1 \\ -1 & -1 & -1 & 0 & 1 & 1 & 1 & 1 & 1 \\ -1 & -1 & -1 & -1 & 0 & 1 & 1 & 1 & 1 \\ -1 & -1 & -1 & -1 & -1 & 0 & 1 & 1 & 1 \\ -1 & -1 & -1 & -1 & -1 & -1 & 0 & 1 & 1 \\ -1 & -1 & -1 & -1 & -1 & -1 & -1 & 0 & 1 \\ -1 & -1 & -1 & -1 & -1 & -1 & -1 & -1 & 0 \end{bmatrix}$$

$$K_w = \begin{bmatrix} -1 & -1 & -1 & -1 & -1 & -1 & -1 & -1 & 0 \\ -1 & -1 & -1 & -1 & -1 & -1 & -1 & 0 & 1 \\ -1 & -1 & -1 & -1 & -1 & -1 & 0 & 1 & 1 \\ -1 & -1 & -1 & -1 & -1 & 0 & 1 & 1 & 1 \\ -1 & -1 & -1 & -1 & 0 & 1 & 1 & 1 & 1 \\ -1 & -1 & -1 & 0 & 1 & 1 & 1 & 1 & 1 \\ -1 & -1 & 0 & 1 & 1 & 1 & 1 & 1 & 1 \\ -1 & 0 & 1 & 1 & 1 & 1 & 1 & 1 & 1 \\ 0 & 1 & 1 & 1 & 1 & 1 & 1 & 1 & 1 \end{bmatrix}$$

In the system described above, the neighborhood of the pixel p has a rectangular shape.

In the system described above, a standard deviation for the 1D Gaussian filter is from about 1.5 to about 2.

The method described above further comprises blending noise contributions from an approximation part and an edge of the raw image, comprising: (f) determining a blending weight $w_b(p)$ as a function of $\alpha(p)$ and $m(p)$, wherein: (i) $\alpha(p)$ is a variability of an angle in a direction of a normal to the edge near the pixel p; and (ii) $m(p)$ is a measure of a similarity between pixels in a neighborhood of the pixel p and a patch with a strong edge separating two flat areas; and (g) blending the noise contributions as a function of the blending weight $w_b(p)$, thereby expediently denoising the raw image.

The method described above further comprises removing a halos around the edge in the raw image, wherein: (a) determining a first minimal value $z_{min}$ among the denoised value z of the pixel p and the shifted denoised values $z_-$ and $z_+$ (b) determining a first maximal intensity among the denoised value z of the pixel p and the shifted denoised values $z_-$ and $z_+$ (c) determining a second maximal intensity among the sharpened edge denoised value $z_{sharp}$ of the pixel p and the first minimal intensity; (d) determining a halos removed denoised value of the pixel p as the minimal intensity among the second maximal intensity and the first maximal intensity.

According to yet another aspect of the invention, there is provided a method for blending an approximation noise and an edge noise for a pixel p from an approximation part and an edge of a raw image respectively, the method comprising: employing a hardware processor for: (a) determining a blending weight $w_b(p)$ for blending the approximation noise and the edge noise as a function of $\alpha(p)$ and $m(p)$, comprising: (i) determining $\alpha(p)$ as a variability of an angle measure in a direction of a normal to the edge near the pixel p; and (ii) determining $m(p)$ as a measure of a similarity between pixels in a neighborhood of the pixel p and a patch with a strong edge separating two flat areas; and (b) blending the approximation noise and the edge noise as a function of the blending weight $w_b(p)$, thereby expediently denoising the raw image.

According to another aspect of the invention, there is provided a method for blending noise contributions from an approximation part and an edge of a raw image, the method comprising: employing a hardware processor for: for a pixel p: (a) determining an approximation noise from the approximation part of the raw image; (b) determining an edge noise from the edge of the raw image; (c) determining a blending weight $w_b(p)$ as a function of $\alpha(p)$ and $m(p)$, wherein: (i) $\alpha(p)$ is a variability of an angle in a direction of a normal to the edge near the pixel p; and (ii) $m(p)$ is a measure of a similarity between pixels in a neighborhood of the pixel p and a patch with a strong edge separating two flat areas; and (d) blending the approximation noise and the edge noise as a function of the blending weight $w_b(p)$, thereby expediently denoising the raw image.

According to yet another aspect of the invention, there is provided a method for denoising a raw image, the method comprising: employing a hardware processor for: for a pixel p: (a) determining an approximation noise from an approximation part of the raw image; (b) determining an edge noise from an edge of the raw image; (c) determining a blending weight $w_b(p)$ as a function of $\alpha(p)$ and $m(p)$, wherein: (i) $\alpha(p)$ is a variability of an angle in a direction of a normal to the edge near the pixel p; and (ii) $m(p)$ is a measure of a similarity between pixels in a neighborhood of the pixel p and a patch with a strong edge separating two flat areas; and (d) blending the approximation noise and the edge noise as a function of the blending weight $w_b(p)$, thereby expediently denoising the raw image.

According to another aspect of the invention, there is provided a system of denoising an edge in a raw image, the edge comprising a pixel p, the system comprising: (a) means for determining a direction of a normal to the edge; (b) means for determining neighboring pixels in a neighborhood of the pixel p; (c) means for projecting the neighboring pixels to the normal to the edge, forming projected pixels; (d) means for determining weighted intensities of the neighboring pixels, comprising: (i) means for determining a set of weights, comprising applying a one dimensional, 1D, Gaussian filter centered on the pixel p and acting on the projected pixels; and (ii) means for adjusting intensities of the neighboring pixels according to the set of weights; and (e) means for determining a denoised value z of the pixel p using the weighted intensities, thereby denoising the edge of the raw image expediently.

Thus, an improved system, and method for denoising digital images have been provided.

BRIEF DESCRIPTION OF DRAWINGS

The embodiments of the invention will now be described, by way of example, with reference to the accompanying drawings, in which:

FIG. 3A1 shows a table having pixel patches for non-local means filter according to an embodiment of present invention;

FIG. 3C1 shows a table having a first example of patches containing pixels (p) and (q) according to an embodiment of present invention;

FIG. 3C2 shows a table having a second example of patches containing pixels (p) and (q) according to an embodiment of present invention;

FIG. 3C3 shows a table having a third example of patches containing pixels (p) and (q) according to an embodiment of present invention;

FIG. 3C4 shows a table having a fourth example of patches containing pixels (p) and (q) according to an embodiment of the present invention;

FIG. 4 illustrates a system for demosaic artifact suppression in digital images according to yet another embodiment of the invention;

FIG. 5A1 illustrates a table having an example for determining an average luminance L1p of the pixel p, according to an embodiment of the present invention;

FIG. 5A2 illustrates a table having an example for determining an average luminance L2p of the pixel p, according to an embodiment of the present invention;

FIG. 5A3 illustrates a table having an example for determining an average luminance L3p of the pixel p, according to an embodiment of the present invention;

FIG. 5A4 illustrates a table having an example for determining an average luminance L4p of the pixel p, according to an embodiment of the present invention;

FIG. 9 illustrates a block diagram of a method of blending digital images according to another embodiment of the invention;

DETAILED DESCRIPTION OF THE EMBODIMENTS OF THE INVENTION

Denoising

Figure 1:
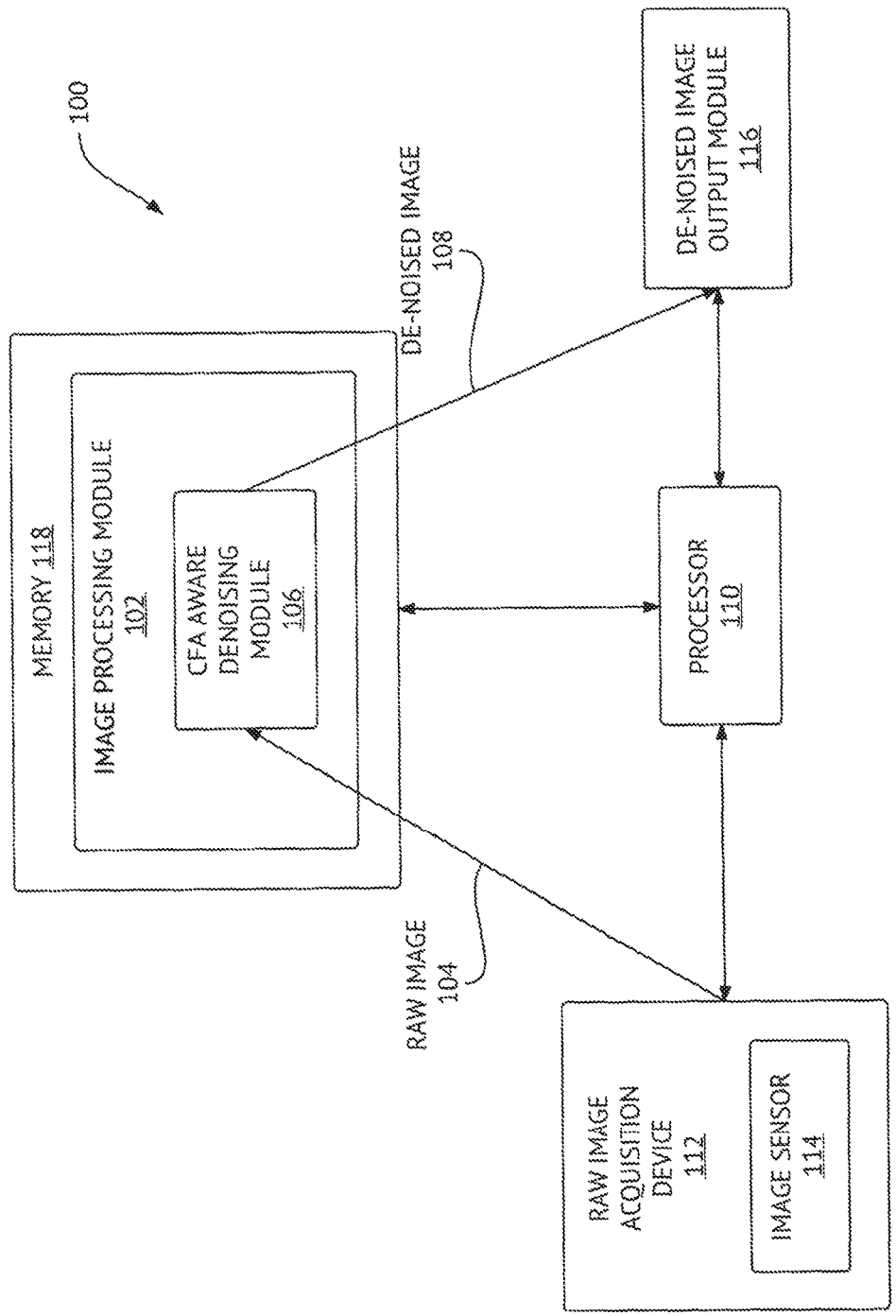
FIG. 1 illustrates a system for denoising of digital images according to an embodiment of the invention.

According to one embodiment of the invention, a method and system for denoising digital images are provided, where a Non-Local Means filter is modified to take into account a color filter pattern of an image sensor. In particular, only pixels of the same color are averaged together and processed by the Non-Local Means filter. In an embodiment of the invention, the color filter array is a Bayer's filter. A repetitive pattern of the Bayer's filter is taken into account, and the Non-Local Means method is modified to search only for every other row and every other column when matching neighborhoods of pixels, thus processing only pixels of the same color. As a result, the quality of denoising has been improved.

Demosaic Artifact Suppression

According to another embodiment of the present invention, a method is provided that is used as a post processing of the demosaiced image. In contrast to the prior art methods, where usually an edge detection is explicitly performed, the method of the another embodiment of the present invention performs an image restoration without any explicit edge detection. The method of the another embodiment of the present invention attenuates or removes demosaic artifacts that appear as repetitive patterns known as zipper artifacts, however it is not applicable to removing color artifacts, introduced by some demosaicers.

The method applies the cross bilateral filter with improved guide on the RGB image, where the improved guide of the cross bilateral filter is carefully chosen to take advantage of the regular patterns typically seen in demosaicing artifacts. The cross bilateral filter, also known as joint bilateral filter, has been described in "*Flash Photography Enhancement Via Intrinsic Relighting*," E. Eisemann and F. Durand, ACM Trans. on Graphics, vol. 23, no. 3, pp. 673-678, August 2004 and "*Digital Photography With Flash And No-Flash Image Pairs*," G. Petschnigg, R. Szeliski, M. Agrawala, M. Cohen, H. Hoppe, and K. Toyama, ACM Trans. on Graphics, vol. 23, no. 3, pp. 664-672, August 2004, and a detailed description of the bilateral filter and its extensions is provided in "*Bilateral Filtering: Theory And Applications*," S. Paris, P. Kornprobst, J. Tumblin, and F. Durand, Foundations and Trends in Computer Graphics and Vision, vol. 4, no. 1, pp. 1-75, 2009.

The guide that is used in cross bilateral filter, for performing demosaic artifact suppression, is a 4 channel image, which can also be seen as a function that maps each pixel of the digital image to a 4 dimensional vector. The guide is computed during the filtering process, or precomputed before filtering, as follows. For each pixel p we consider the 4 blocks of 2 by 2 pixels that contain a pixel of interest p. We compute the average luminance on each of those 2×2 blocks to get a four dimensional feature vector corresponding to the pixel p. The 4-dimensional vector gives 4 values for the guide corresponding to the pixel p.

The effect of cross bilateral filtering is to make intensities of two pixels p and q more similar if their corresponding four dimensional feature vectors in the guide are similar, and p and q are spatially close enough.

In the embodiments of the present invention, the improved guide based on the four dimensional feature vector is used in the cross bilateral filter, for performing artifact suppression on the demosaiced image. Thus, an improved cross bilateral filter having an improved guide of the embodiment of the present invention, has been provided.

In an area where the demosaiced image should be uniform, many demosaicers typically produce a non-uniform image, for example, the demosaiced image exhibits repetitive patterns where two neighboring blocks of 2×2 pixels are symmetric with respect to one another.

In particular, neighboring blocks of 2×2 pixels have approximately the same mean intensity, when the underlying true image is actually uniform. The same considerations also apply for an area of the demosaiced image where there is an edge with a slope that is approximately a multiple of 45 degrees. Two 2×2 pixel blocks that are neighbors along the direction of the edge have approximately the same mean intensities. While the average of the 2×2 pixel blocks are similar, pixel values are not, because of the zipper artifact, even though they should similar.

The cross bilateral filter takes the advantage of the similarity of the average luminance of the 2×2 pixel blocks, to make those pixels more similar.

Thus, improved methods and systems for denoising and blurring parts of digital images have been provided.

Glossary

Bayer Filter Mosaic: a color filter array (CFA) for arranging RGB color filters on a square grid of photo sensors. Bayer Filter Mosaic is described in an article titled "Bayer filter", which is published on-line by Wikipedia, downloaded 16 Mar. 2017, and which is submitted in the information disclosure statement for the present application, the entire contents of the article being incorporated herein by reference.

Bilateral Filter: a non-linear, edge-preserving and noise-reducing smoothing filter for images. The intensity value at each pixel in an image is replaced by a weighted average of intensity values from nearby pixels. Bilateral Filters are described in an article titled "Bilateral Filter", which is published on-line by Wikipedia, downloaded 16 Mar. 2017, and which is submitted in the information disclosure statement for the present application, the entire contents of the article being incorporated herein by reference.

Non-local Means: an algorithm in image processing for image denoising. Unlike "local mean" filters, which take the mean value of a group of pixels surrounding a target pixel to smooth the image, non-local means filtering takes a mean of all pixels in the image, weighted by how similar these pixels are to the target pixel. Non-local Means is described in an article titled "Non-local Means", which is published on-line by Wikipedia, downloaded 16 Mar. 2017, and which is submitted in the information disclosure statement for the present application, the entire contents of the article being incorporated herein by reference.

Raw Image: or raw digital image, a file that contains minimally processed data from the image sensor of either a digital camera, image scanner, or motion picture film scanner. Raw Images are described in an article titled "Raw image format", which is published on-line by Wikipedia, downloaded 16 Mar. 2017, and which is submitted in the information disclosure statement for the present application, the entire contents of the article being incorporated herein by reference.

Integral Image (also known as a summed area table): a data structure and algorithm for quickly and efficiently generating the sum of values in a rectangular subset of a grid. Integral Images are described in an article titled "Summed area table", which is published on-line by Wikipedia, downloaded 16 Mar. 2017, and which is submitted in the information disclosure statement for the present application, the entire contents of the article being incorporated herein by reference.

Demosaicing (also referred to as de-mosaicing, demosaicking or debayering) algorithm: a digital image process used to reconstruct a full color image from the incomplete color samples output from an image sensor overlaid with a color filter array (CFA). It is also known as CFA interpolation or color reconstruction. Demosaicing is described in an article titled "Demosaicing", which is published on-line by Wikipedia, downloaded 16 Mar. 2017, and which is submitted in the information disclosure statement for the present application, the entire contents of the article being incorporated herein by reference.

Anscombe Transform: a variance-stabilizing transformation that transforms a random variable with a Poisson distribution into one with an approximately standard Gaussian distribution. The Anscombe Transform is described in an article titled "Anscombe Transform", which is published on-line by Wikipedia, downloaded 16 Mar. 2017, and which is submitted in the information disclosure statement for the present application, the entire contents of the article being incorporated herein by reference.

Neighborhood of pixel p N(p): Set of pixels surrounding pixel p which values are used to denoise pixel p.

Patch diameter or radius M: This measures the span in pixels, in each dimension, of the patches that are considered around each pixels to compute the weights in the averaging formulas. In section 1, M is the radius of the patch, i.e. a patch is a square of $(2M+1)\times(2M+1)$ pixels, while in section 2 M is the diameter of the patch, i.e. a patch is a square of M×M pixels.

Patch kernel: The subscript p stands for "patch", it is not related to pixel p. That function can weight pixels in the patch differently depending on their positions within the patch. It allows for example to have disc shaped patches. It can also be used to give less weights to pixels that are more distant to the centre of the patch, for instance by using a Gaussian kernel.

Patch distance between pixels p and q: This is a similarity measure between the pixels surrounding p and the pixels surrounding q (including pixels p and q). It does not satisfy the mathematical definition of a distance, but with a slight abuse of terminology we still call it a distance.

Neighborhood half radius K: This measures the size of the neighborhood N(p), which is a square of $(4k+1)\times(4k+1)$ pixels.

"h": The physical meaning of "h" is denoising strength. It is a positive value. The higher it is the stronger the denoising is, meaning more noise is removed at the risk of losing some details, and conversely the lower it is the more details are preserved, at the risk of letting still some remaining noise or possibly creating some artifacts.

"ρ": the strength of a high frequency artifact removal filter (which is comparable to h, the strength of the denoiser). The larger it is the more effective it is to remove noise. If it is set to a high value then fine details may disappear.

Sigmoid function: a bounded differentiable real function that is defined for all real input values and has a non-negative derivative at each point. In general, a sigmoid function is real-valued, monotonic, and differentiable having a non-negative first derivative which is bell shaped. The sigmoid function is constrained by a pair of horizontal asymptotes.

1.0 Denoising of Digital Images

A system 100 for denoising of digital images of an embodiment of the invention is shown in FIG. 1. The system 100 comprises a Raw Image Acquisition Device 20, for example a digital camera, image scanner or motion picture film scanner comprising an image sensor device 114 such as CCD (charge coupled device) or CMOS (complementary metal oxide semiconductor) image sensor, for acquiring a raw image 13. The raw image 104 contains minimally processed data from the image sensor 21, in a raw image format.

The acquired raw image 104 is supplied to an Image Processing Module 102 comprising a CFA (color filter array) Pattern Aware Denoising Module 106 for processing the raw image 104 into a denoised image 108. The CFA Pattern Aware Denoising Module 106 takes into account the structure/pattern of the CFA filter. In a preferred embodiment of the invention, the CFA is a Bayer's filter having a Bayer's pattern. The description of embodiments herein is formulated for Bayer CFA but it is equally applicable for any arbitrary CFA, for example Red-Green-Blue-Infrared or Red-Clear-Clear-Green.

The Image Processing Module 102 and CFA Pattern Aware Denoising Module 106 are stored in a non-transitory computer readable memory device 118 and comprise computer executable instructions stored in the memory device 118 for execution by a hardware processor 110. The CFA Pattern Aware Denoising Module 106 outputs the denoised image 108 through a Denoised Image Output Module 116 which contains computer readable instructions stored in a memory (not shown) and is responsible for storage or further processing of the denoised image 108 or transmission of the denoised image 108 over a network.

Figure 2:
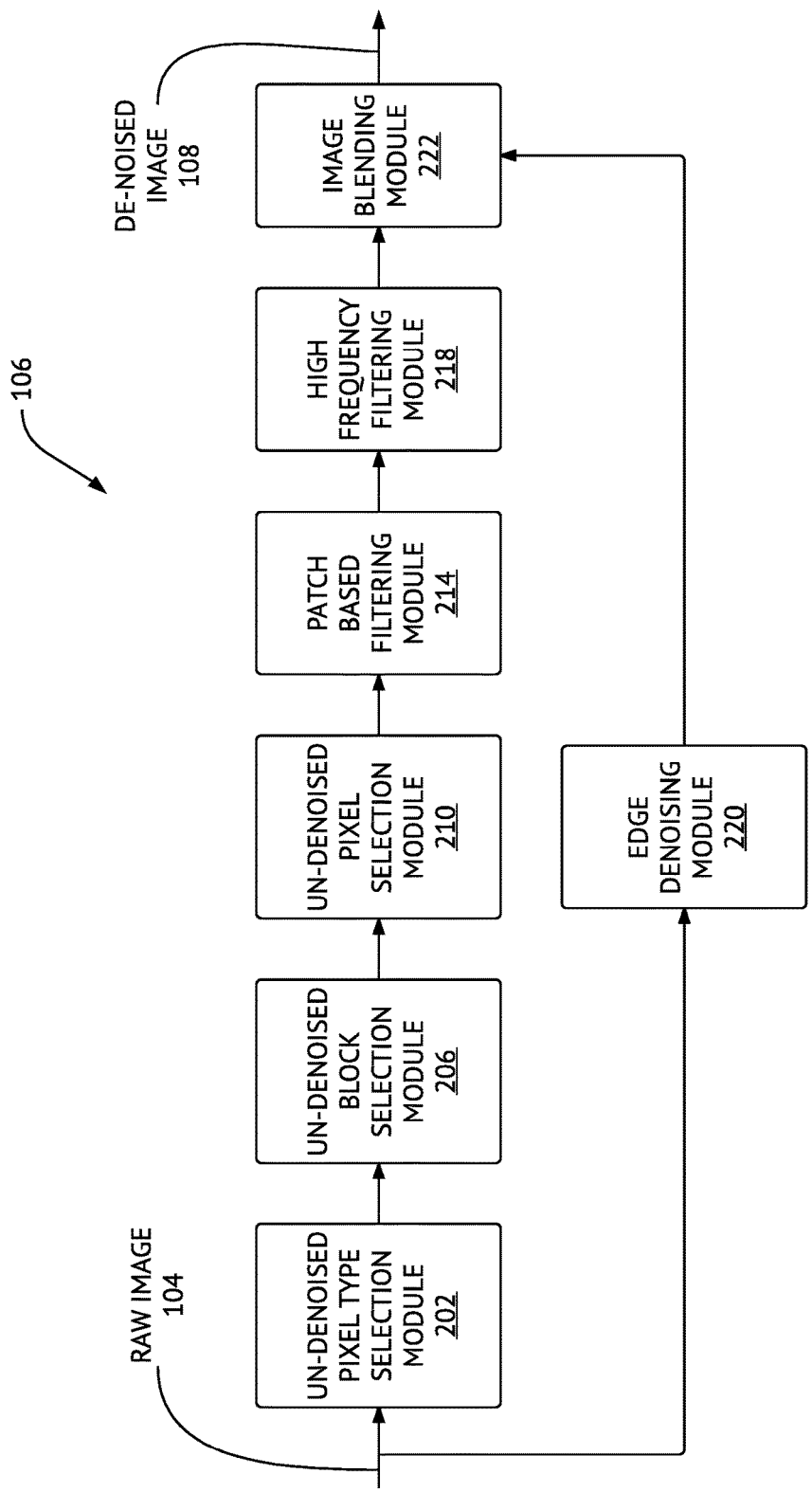
FIG. 2 illustrates a color filter array (CFA) Pattern Aware Denoising module of FIG. 1 in more detail.

FIG. 2 shows the CFA Pattern Aware Denoising Module 106 of FIG. 1 in more detail.

In the embodiment of the invention, the CFA is a Bayer's filter. The CFA Pattern Aware Denoising Module 106 comprises an Undenoised Pixel Type Selection Module 202 for selecting a respective pixel type (such as Red, Green, Blue); an Undenoised Block Selection Module 206 for selecting 2×2 blocks of pixels containing a pixel "p" of interest; an Undenoised Pixel Selection Module 210 for selecting pixels to be denoised; and a Modified Patch Based Filtering Module 214 for applying a modified Non-Local Means (NLM) filter of the embodiment of the invention, or a patch based filter, or a bilateral filter, for denoising the pixel "p" of interest. The Pattern Aware Denoising Module 106 preferably includes a High Frequency Filtering Module 218 which is described in detail herein below for providing a texture preserved denoised image 219. The Pattern Aware Denoising Module 106 also preferably includes an edge denoising module 220 which is described in detail herein below. The Pattern Aware Denoising Module 106 also preferably includes an image blending module 222 which is described in detail herein below.

It is understood that other types of CFA are also possible, and the NLM filter may be generally substituted by a patch based filter or a bilateral filter suitable for processing a raw image obtained according to a respective CFA.

The Undenoised Pixel Type Selection Module 202, the Undenoised Block Selection Module 206, the Undenoised Pixel Selection Module 210, and the Modified Patch Based Filtering Module 214 comprise computer readable instructions stored in a memory for execution by the hardware processor 110.

Figure 3A:
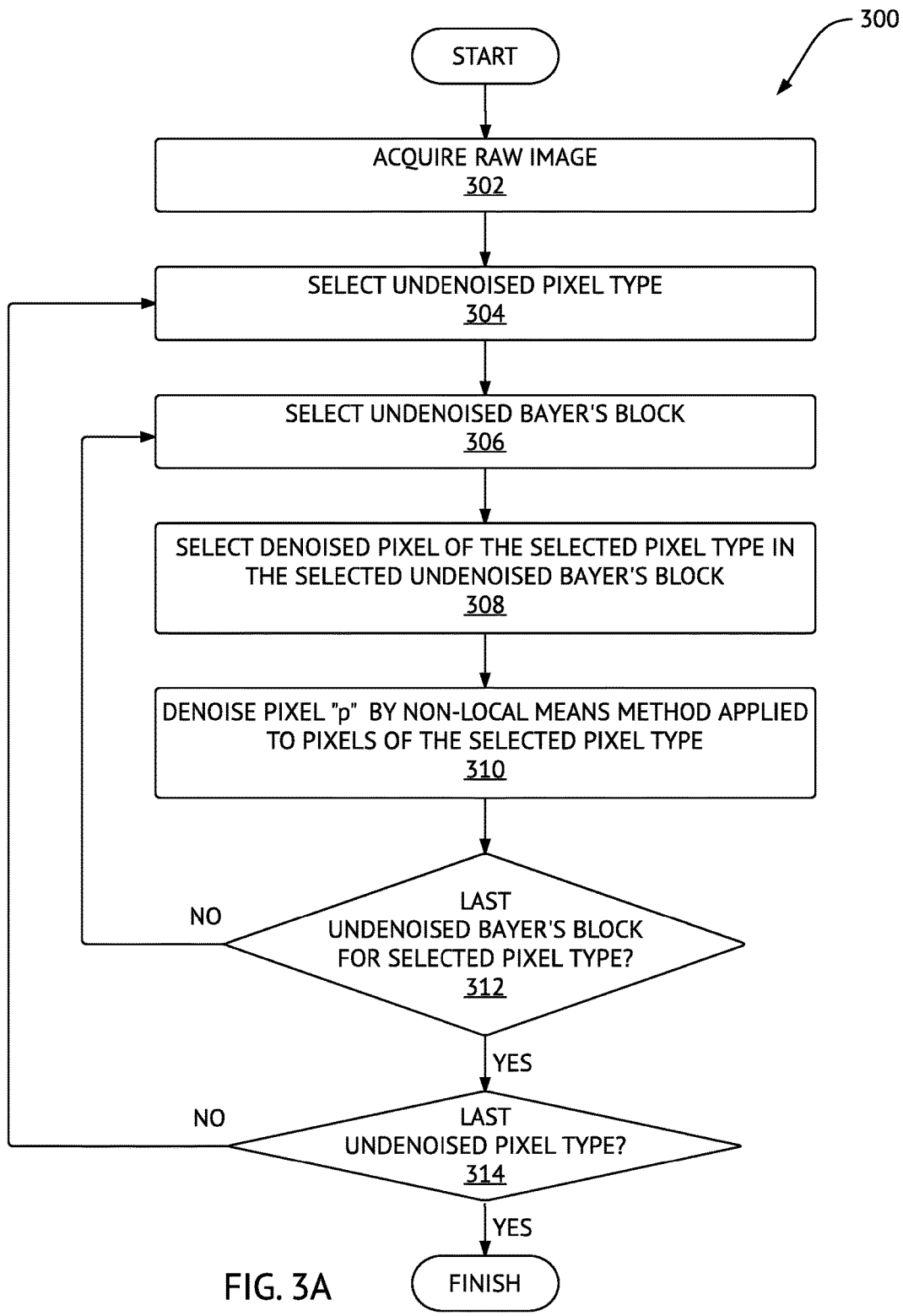
FIG. 3A shows a flowchart illustrating a method for denoising of digital images according to an embodiment of the present invention.

The method for denoising of digital images of the embodiment of the invention is illustrated by a flowchart 300 of FIG. 3A.

Upon acquisition of the raw image 104 by the Raw Image Acquisition Device 112 (box 302), the method selects undenoised pixel type, which has not been processed yet (box 304). For Bayer's pattern, the pixel type is (R, G1, G2, B), where R=red, G1=green1, G2=green2, and B=blue.

An example of the above method follows. For simplicity, it is assumed that the first pixel type that has been selected is R.

Next, an undenoised Bayer's block of 2×2 pixels is selected, which has not been processed yet (box 306), followed by selection (box 308) of undenoised pixel ("p") of the selected pixel type (for example R) in the selected undenoised Bayer's block of 2×2 pixels.

Next, the selected pixel "p" is denoised by using a Non-Local Means filter or another patch based filter or bilateral filter (box 310), which is applied only to the pixels of the selected pixel type (for example only to pixels R). This means searching for neighboring pixels "q" of the selected pixel type only. However, even though "p" and "q" are of the same type, when computing distance between their respective patches, we include all pixels of the two patches, regardless of their types. Since "p" and "q" are of the same type, when taking the difference of the two patches, only differences between pixels of the same types are performed. For instance suppose pixel "p" is of type R, Bayer's pattern alignment is RGGB and we consider 3×3 patches surrounding the pixel of interest. Then for both "p" and "q" the types of the pixels of their respective patches are the same, as can be seen in FIG. 3A1.

The distance between the two patches shown on FIG. 3A1 would be:

$$d(p,q)^2 = (I(p_1)-I(q_1))^2 + (I(p_2)-I(q_2))^2 + (I(p_3)-I(q_3))^2 + (I(p_4)-I(q_4))^2 + I(p_5)-I(q_5))^2 + (I(p_6)-I(q_6))^2 + (I(p_7)-I(q_7))^2 + (I(p_8)-I(q_8))^2 + (I(p)-I(q))^2$$

Then, the next pixel of the same selected pixel type is selected in the next Bayer's block (box 312). If the next Bayer's block is not the last undenoised Bayer's block for the selected pixel type (exit "No" from box 312), the method returns to box 306 for selecting the next Bayer's block for processing, containing the next pixel of the selected pixel type.

Otherwise, if the next Bayer's block is the last undenoised Bayer's block for the selected pixel type (exit "Yes" from box 302), the method proceeds to checking if all pixel types have been processed (box 304).

Provided the pixel type is not the last undenoised pixel type (exit "No" from box 304), i.e. there are other remaining pixel types available for processing, the method returns to box 304 for selected the next undenoised pixel type, for example, G1, G2 or B.

Otherwise, provided the pixel type is the last undenoised pixel type (exit "Yes" from box 304), the method outputs a denoised image 108, through the Denoised Image Output Module 116, and the method is terminated.

1.1 Method for Denoising of Digital Images

The method and system for denoising of digital images of the embodiment of the present invention is suitable for digital images which have a repetitive spatial structure, for CFA pattern in raw digital images.

As an example, we describe a method for performing denoising directly on a raw image having a Bayer's pattern. The method for denoising of the embodiment of the invention is an adaptation of the Non Local Means (NLM) method for a raw image.

A raw image with Bayer's pattern comprises blocks of 2 by 2 pixels. Two of these pixels record the intensity of the green light, and the remaining two pixels record the intensity of red and blue light.

This means that using the prior art NLM method on a raw image would not make sense because intensity values of lights of different colors would be averaged together.

In the present application, the NLM algorithm has been modified to take into account the Bayer pattern. One way of doing this is to search only every other row and every other column when matching the pixel patches.

Let I be the raw noisy image and Î be the resulting image after denoising, for each pixel p, $$\hat{I}(p) = \frac{1}{C(p)} \sum_{x=-k}^{k} \sum_{y=-k}^{k} I(p + 2(x, y)) w(p, p + 2(x, y)).$$

In the embodiment of the invention, the difference with the prior art NLM algorithm is that we skip odd columns and odd rows, with respect to the pixel of interest p, when we use the factor 2 in front of (x,y) in the equation above.

The parameters in the above noted equation are defined as follows, i.e.

$$\text{when } p \ne q, w(p, q) = \exp\left(-\frac{d(p, q)^2}{h^2}\right),$$

$$\text{or the variation } w(p, q) = \exp\left(-\frac{\max(0, d(p, q)^2 - 2\sigma^2)}{h^2}\right),$$

$$\text{when } p = q, w(p, p) = \max_{q \in B(p), q \ne p} w(p, q),$$

$$\text{with } B(p) = \{p + 2(x, y) \mid -k \le x, y \le k\},$$

$$C(p) = \sum_{x=-k}^{k} \sum_{y=-k}^{k} w(p, 2(x, y)),$$

$$d(p, q)^2 = \sum_{x=-M}^{M} \sum_{y=-M}^{M} K_p(x, y)(I(p + (x, y)) - I(q + (x, y)))^2$$

$K_p$ is a positive weighting kernel that puts a different weight on each pixel of the patch. It can be chosen uniform, such as K{1, or decreasing with distance from the pixel at the center of the neighborhood (for instance a Gaussian kernel).

M and k are small integers (typically $M \in \{1, \ldots, 4\}$ and $k \in \{1, \ldots 12\}$), h is a real number. Those constants are chosen depending on the prevalence of the noise in the image, the stronger the noise, the higher they are. The constant T is the standard deviation of the noise in case the noise can be assumed to have uniform standard deviation across the image.

2.0 Texture Preserving Denoising

We now describe another embodiment of the raw image denoiser. The difference with the original algorithm is in the way we compute the distance d(p, q) between the patch of the pixel to be denoised p and the patches of its neighboring pixels $q \in N(p) = \{p+2(i,j); i, j \in \{-K, \ldots, K\}\}$ where integer K is a parameter (the neighborhood radius). That new way of computing the distance between patches allows better preservation of textures and fine details. In the original algorithm we compute $d(p, q)^2$ as the squared Euclidean distance between the 2 patches centered at p and q respectively, i.e.

$$d_{orig}(p, q)^2 = \sum_{x=-M}^{M} \sum_{y=-M}^{M} K_p(x, y)(I(p + (x, y)) - I(q + (x, y)))^2$$

Figure 3B:
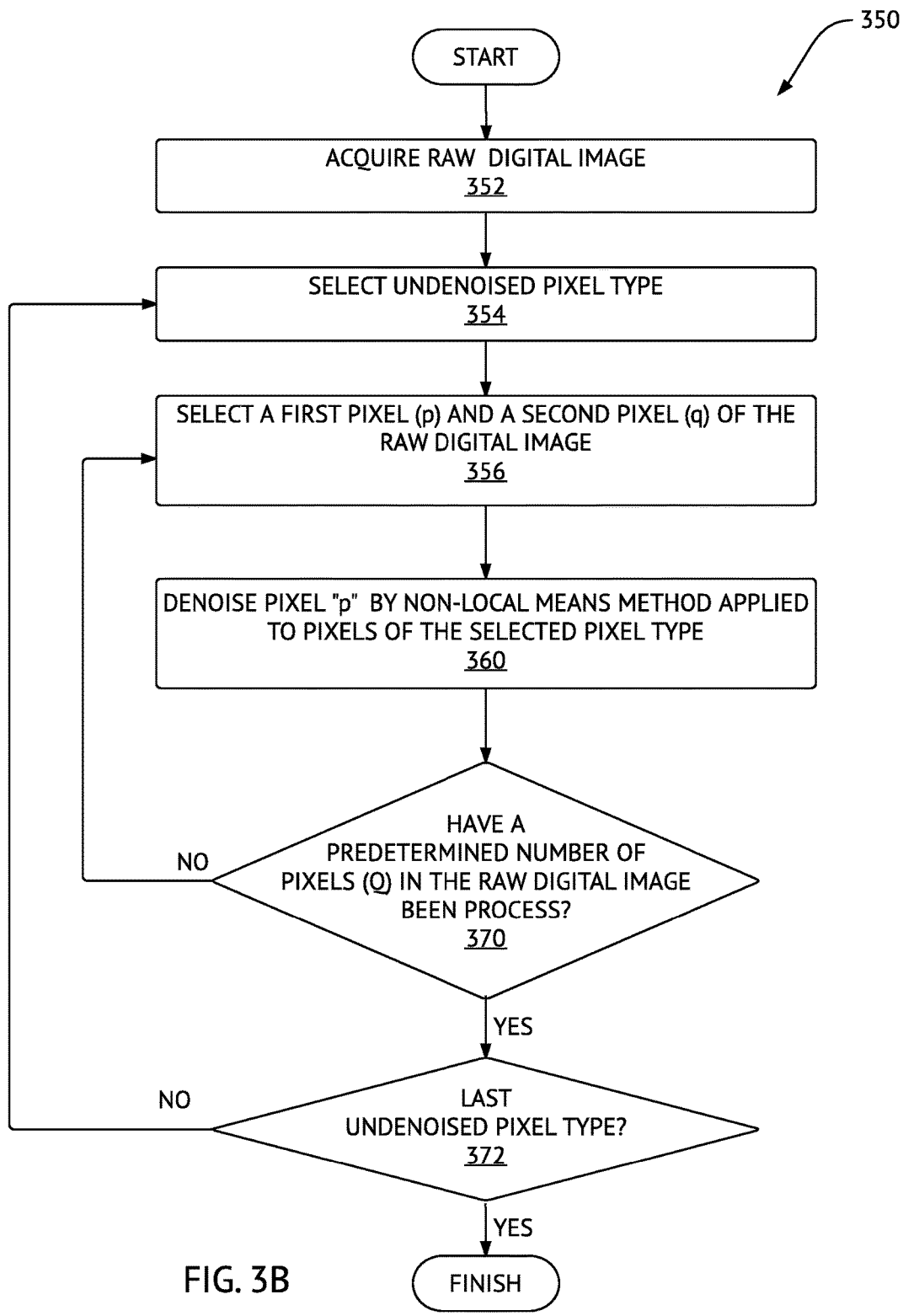
FIG. 3B shows a flowchart illustrating a method for denoising of digital images according to another embodiment of the present invention.
Figure 3C:
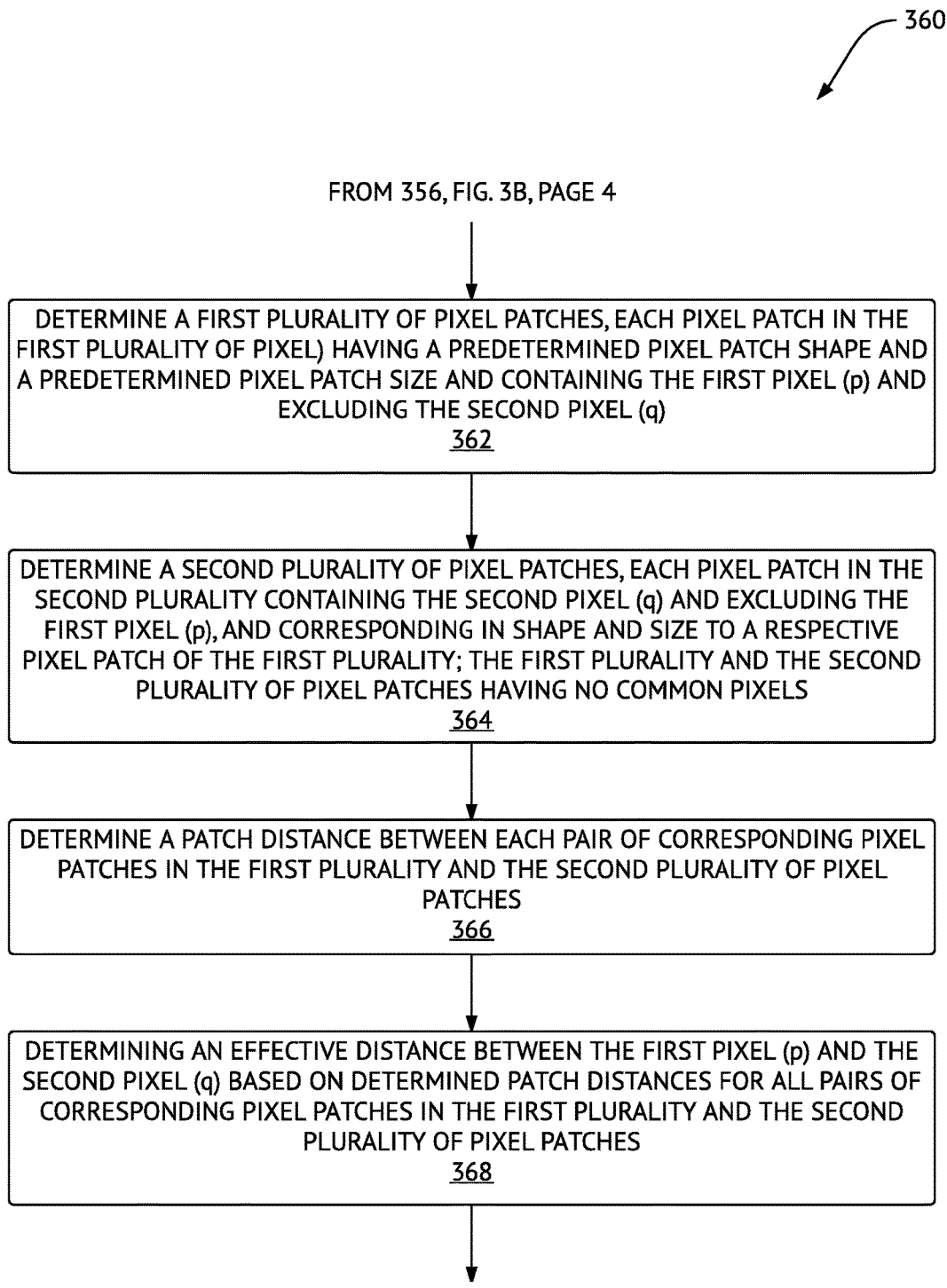
FIG. 3C shows a flowchart illustrating a method of a step in the flowchart shown in FIG. 3B.

The method for denoising of digital images of the embodiment of the invention is illustrated by a flowcharts 350 and 360 of FIG. 3B and FIG. 3C respectively. The steps 352, 354, 356, 3370, and 372 are substantially the same as respective steps 302, 304, 306, 308, 312, and 314 as described herein above. Step 360 is described in detail with reference to FIG. 3C.

After box 356 on FIG. 3B, a first plurality of pixel patches, each pixel patch in the first plurality of pixel having a predetermined pixel patch shape and a predetermined pixel patch size and containing the first pixel (p) is determined, box 362.

Then determining a second plurality of pixel patches, each pixel patch in the second plurality containing the second pixel (q), and corresponding in shape and size to a respective pixel patch of the first plurality, box 364.

Then a patch distance between each pair of corresponding pixel patches in the first plurality and the second plurality of pixel patches is determined, box 366.

Then an effective distance between the first pixel (p) and the second pixel (q) based on determined patch distances for all pairs of corresponding pixel patches in the first plurality and the second plurality of pixel patches is determined, box 368.

Then execution returns to box 370 on FIG. 3C.

2.1 Patch Distance for Texture Preserving Denoising

In the texture preserving version of the raw image denoiser we not only consider the patches that are centered at p and q, but also all patches that are shifted by some offset and that still keep pixel p within the patch. Then $d(p, q)^2$ in the texture preserving version of the denoiser is the maximum of the squared distances between all pairs of shifted patches, with the same shift for both patches. Note that in this version we not only allow patches of odd size (like 3 by 3 pixels) but also of even size (like 2 by 2 pixels), in this setting, M denotes the patch size (i.e. its diameter) while it denoted the patch radius in the description of the original algorithm and in the formula of $d_{orig}(p,q)^2$ above.

We are now going to give an explicit formula to compute the distance d(p, q: in the texture preserving version, to this end we introduce the following notation:

$$\delta(p, q, i, j) = \sum_{x=j-M+1}^{j} \sum_{y=i-M+1}^{i} K_p(x, y, i, j)(I(p + (x, y)) - I(q + (x, y)))^2$$

$$\text{with } i, j \in \{0, \ldots, M-1\}.$$

δ(p, q, i, j) is the squared distance between patches shifted by offset (i, j) containing p and q. The function $K_p$ can be used to make the shape of the patch different from a square (for example a disc-like shape) by putting weight 1 to some pixels and weight 0 to the others. It can also be used to give more weight to some pixels than others. Pixel patches are preferably square or rectangular, however it is understood that pixel patches of other shapes may be chosen, for example, circle, oval, hexagon, octagon, polygon, or patches of an arbitrary shape. Using $K_p\{x, y, i, j\}=1$ is also acceptable and makes possible to speed up the algorithm as described in section 2.5.

The squared distance between pixels p and q is computed by aggregating all the $\delta(p, q, i, j)$ with an aggregation function A:

$$d(p,q)^2 = A(\delta(p,q,0,0), \ldots, \delta(p,q,0,M-1), \delta(p,q,1,0), \ldots, \delta(p,q,M-1,M-1))$$

That aggregation function may be for example the mean or average across the $\delta(p, q, i, j)$:

$$d(p, q)^2 = \frac{1}{(M-1)^2} \sum_{i=0}^{M-1} \sum_{j=0}^{M-1} \delta(p, q, i, j)$$

The best aggregation for the purpose of preserving texture details is the maximum function:

$$d(p, q)^2 = \max_{i,j \in \{0,\ldots,M-1\}} \delta(p, q, i, j)$$

2.2 Example with M=2

An example of distance computation is presented in FIG. 3C1, FIG. 3C2, FIG. 3C3 and FIG. 3C4 for the 4 possible shifts when the patch size is M=2 and assuming $K_p\{x, y, i, j\}=1$.

FIG. 3C1 shows a first example of patches containing pixels (p) and (q).

$$\delta(p,q,0,0) = (I(p_1)-I(q_1))^2 + (I(p_2)-I(q_2))^2 + (I(p_4)-(q_4))^2 + I(p)-I(q))^2$$

FIG. 3C2 shows a second example of patches containing pixels (p) and (q).

$$\delta(p,q,0,1) = (I(p_2)-I(q_2))^2 + (I(p_3)-I(q_3))^2 + I(p)-I(q))^2 + I(p_5)-I(q_5))^2$$

FIG. 3C3 shows a third example of patches containing pixels (p) and (q).

$$\delta(p,q,1,0) = (I(p_4)-I(q_4))^2 + I(p)-I(q))^2 + (I(p_6)-I(q_6))^2 + (I(p_7)-I(q_7))^2$$

Figure 4:
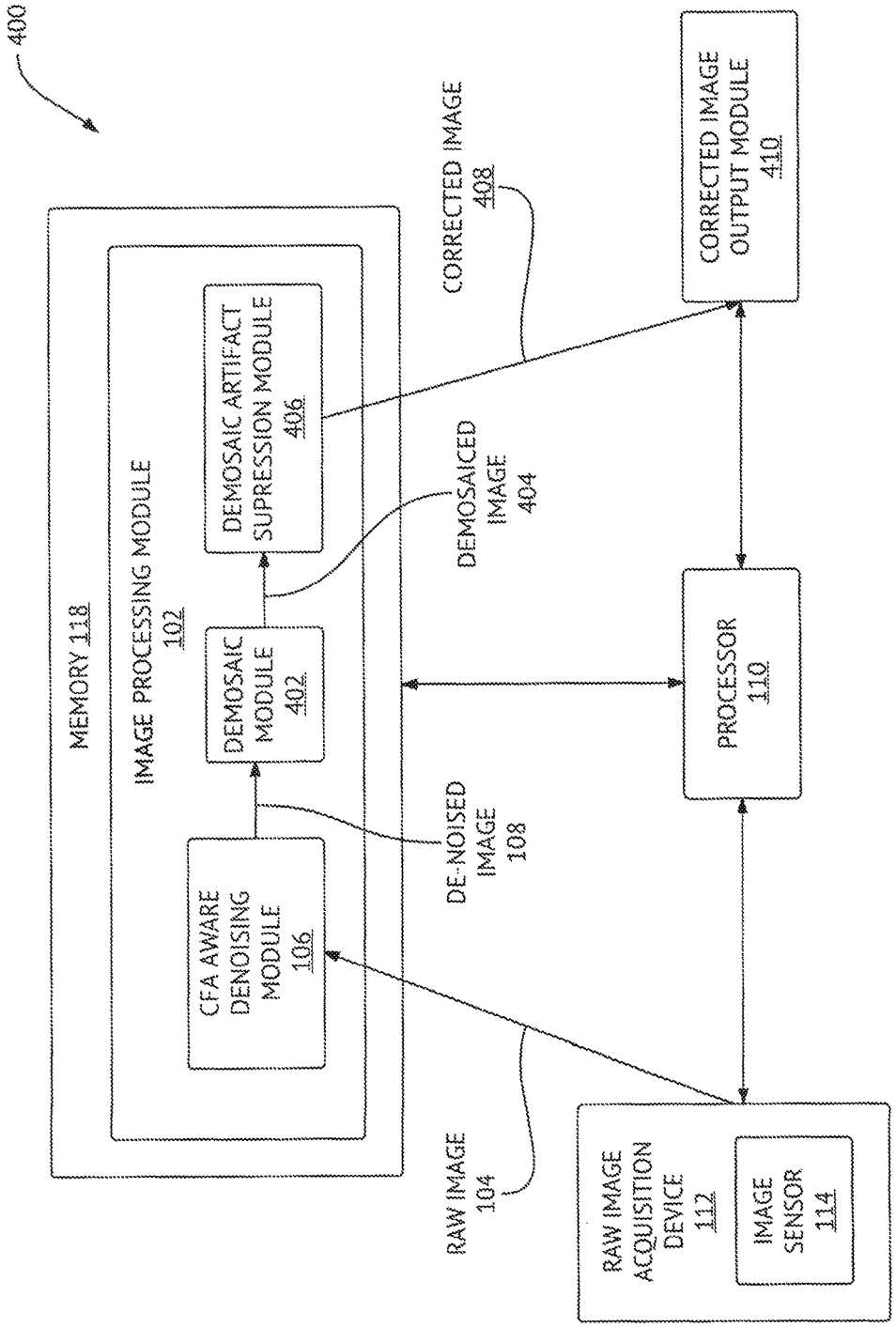

FIG. 3C4 shows a fourth example of patches containing pixels (p) and (q).

$$\delta(p,q,1,1) = I(p)-I(q))^2 + (I(p_5)-I(q_5))^2 + (I(p_7)-I(q_7))^2 + (I(p_8)-I(q_8))^2$$

2.3 Discussion of the Distance for Texture Preservation

This way of computing the distance between pixels helps to denoise more strongly flat areas compared to textured areas. Hence it favors details preservation where there are details to be preserved and conversely does a better cleaning of the image where there are less details. In a textured area, the highest $\delta(p, q, i, j)$ is likely to be especially high, since it is based on the difference between different features (or different parts of the same feature). In a flat area, on the contrary the patches roughly have the same score. This tends to make the distance larger for textured areas than for flat areas, and then to make weights w(p, q) smaller for textured areas than for flat areas. As a result denoising tends to be stronger for flat areas than for textured areas.

2.4 Overall Denoising Formula

The rest of the algorithm is identical to the original algorithm, just replacing $d(p, q)^2$ by its alternative definition. The final formula to compute the denoised pixel p is:

$$\hat{I}(p) = \frac{1}{C(p)} \sum_{q \in N(p)} \exp\left(\frac{-d(p, q)^2}{h^2}\right) I(q) \text{ with } C(p) = \sum_{q \in N(p)} \exp\left(\frac{-d(p, q)^2}{h^2}\right)$$

h is the strength of the denoiser. Ranges of useful values for parameters are given at section 2.6.

Remark: By default $N(p)=\{p+2\{i, j\}; i, j \in \{-K, \ldots, K\}\}$ but it is also possible to choose a different shape for N(p), the only requirement is that it only contains pixels of the same Bayer type as pixel p. For instance a disc-like shape would be $N(p)=\{p+2\{i, j\}; i, j \in \{-K, \ldots, K\}, i^2+j^2 \leq K^2\}$. Alternatively, the neighborhood shape may be a circle, an oval, a hexagon, an octagon, or a polygon, or any arbitrary shape. However a rectangular shape for N(p) has the advantage to make possible to speed up the algorithm as described in section 2.5. In its most general form, a rectangular shape for N(p) would be:

$N(p)=\{p+2(i, j); i \in \{-K_1, \ldots, K_1\}, j \in \{-K_2, \ldots, K_2\}\}$ with $K_1$ and $K_2$ positive integers.

2.5 Computational Complexity

An implementation of the above texture preserving version of the distance would be significantly more expensive than the original version for a given patch size. Computing $\delta(p,q,i,j)$ requires two nested loops of M iterations each, d(p,q) requires two nested loops of M iterations each too, then the sum over $q \in N(p)$ requires two nested loops of N iterations each. The computational complexity of the version of the texture preserving denoiser is $\Theta(N_{pix} K^2 M^4)$ where $N_{pix}$ is the number of pixels in the input image, while the complexity of the original denoiser is $\Theta(N_{pix} K^2 M^2)$, so the texture preserving denoiser requires $M^2$ times more computations.

However, in the case where $K_p(x, y, i, j)=1$ and N(p) has a rectangular shape, multiple computations of the same squared difference between pixel intensities can be avoided by using the technic of integral images. Reference for integral image method: "*Rapid Object Detection using a Boosted Cascade of Simple Features*" P. Viola, M. Jones, CVPR 2001. In our case this technic would allow to reuse computations of squared differences between pixel intensities across distances of patches that contain the same pair of pixels.

In a more general case, for the integral image method to be applicable, both N(p) and pixel patches should be either square or rectangular, and it still works if only N(p) is square and the pixel patch is rectangular, and vice versa.

When patches are rectangular and N(p) is rectangular, the formulas are:

$$\delta(p, q, i, j) = \sum_{x=j-M_1+1}^{j} \sum_{y=i-M_2+1}^{i} (I(p + (x, y)) - I(q + (x, y)))^2$$

with $M_1 \neq M_2$ and $N(p) = \{p + 2(i, j); i \in \{-K_1, \ldots, K_1\}, j \in \{-K_2, \ldots, K_2\}\}$ with $K_1 \neq K_2$.

When patches are squares and N(p) is rectangular, the formulas are:

$$\delta(p, q, i, j) = \sum_{x=j-M-1}^{j} \sum_{y=i-M+1}^{i} (I(p + (x, y)) - I(q + (x, y)))^2 \text{ and}$$

$$N(p) = \{p + 2(i, j); i \in \{-K_1, \ldots, K_1\}, j \in \{-K_2, \ldots, K_2\}\}$$

with $K_1 \neq K_2$.

When patches are rectangular and N(p) is square, the formulas are:

$$\delta(p, q, i, j) = \sum_{x=j-M_1+1}^{j} \sum_{y=i-M_2+1}^{i} (I(p + (x, y)) - I(q + (x, y)))^2$$

with $M_1 \neq M_2$ and $$N(p) = \{p + 2(i, j); i, j \in \{-K, \ldots, K\}\}.$$

When patches are squares and N(p) is square, the formulas are:

$$\delta(p, q, i, j) = \sum_{x=j-M+1}^{j} \sum_{y=i-M+1}^{i} (I(p + (x, y)) - I(q + (x, y)))^2 \text{ and}$$

$$N(p) = \{p + 2(i, j); i, j \in \{-K, \ldots, K\}\}.$$

The most general form for δ(p,q,i,j) that still allows to use integral images is:

$$\delta(p, q, i, j) = \sum_{x=j-M_1+1}^{j} \sum_{y=i-M_2+1}^{i} (I(p + (x, y)) - I(q + (x, y)))^2$$

Remark: that $K_p(x, y, i, j)$ is missing because it is taken as constant 1 and in the bounds of the summations the constant positive integers $M_1$ and $M_2$ appear instead of just M, in order to allow any rectangular patch instead of just square patches.

Actually patches are not square in this example because in the sum, the variable x spans the integers from j−M1+1 to j, which are M1 different values, and the variable y spans the integers from i−M2+1 to i, which are M2 different values. So the height and the width of the patch are different. So the rectangular shape of the patch is achieved here thanks to the different bounds of the sums rather than thanks to the kernel Kp, because in the case of a rectangular shape is simpler to express it this way. Off course that trick cannot be used if we want a disc-like shape, in that case we would need to use Kp to achieve a disc like shape, but here we only need a rectangular shape, so it is appropriate.

The most general form for N(p) that that still allows to use integral images is:

$N(p)=(p+2(i, j); i \in \{-K_1, \ldots, K_1\}, j \in \{-K_2, \ldots, K_2\}\}$ with $K_1$ and $K_2$ positive integers.

The technic of integral images could be used on the whole image, in that case it takes the complexity down to $\Theta(N_{pix}K_1K_2)$ for both the original and the texture preserving denoisers. For reasons related to the memory it could be impossible to do so, for instance with line buffer architectures. Then the technic of integral images could still be used at the level of the neighborhood N(p) of each pixel p, in that case it takes the complexity down to $\Theta(N_{pix}K_1K_2M_1M_2)$ for the texture preserving denoisers.

We derive computations for applying the technic of integral images to the computations of distances at both the level of the neighborhood N(p) and the level of the whole image. For simplicity of notation we write the derivation for the case M:=$M_1$=$M_2$ but this does not limit the generality of the algorithm to the case $M_1 \neq M_2$.

2.5.1 Integral Image at the Level of the Neighborhood N(p) of Pixel p

We first compute the following quantity:

$$\rho(p, q, y, j) = \sum_{x=j-M+1}^{j} (I(p + (x, y)) - I(q + (x, y)))^2$$

for all $j \in \{0, \ldots, M - 1\}$ and $y \in \{-M + 1, \ldots, M - 1\}$.

To compute it efficiently we use the following recurrence $\rho(p,q,y,j)=\rho(p,q,y,j-1)+(I(p+(j,y))-I(q+(j,y)))^2-(I(p+(j-M,y))-I(q+(j-M,y)))^2$ Then notice that $$\delta\{p, q, i, j\} = \sum_{y=i-M+1}^{i} \rho(p, q, y, j)$$

Then to compute efficiently δ(p,q,i,j) for all i, j∈{0, . . . ,M−1} we use the following recurrence $\delta(p,q,i,j)=\delta(p,q,i-1,j)+\rho(p,q,i,j)-\rho(p,q,i-M,j)$ Using the two recurrences allow to precompute all the δ(p, q, i, j), i, j∈{0, . . . , M−1} with computational complexity $\Theta(M^2)$. This allows to have a computational complexity on the whole image of $\Theta(N_{pix}K^2M^2)$, which is the same as for the original raw image denoiser. In practice we must take into account that the computational complexity has still a multiplicative constant such that there is a speed up with respect to the implementation as soon as M≥3 but not for M=2. More precisely, the number of squared differences that are computed are $M^4$ for the implementation and $(3 M-2)^2$ when using the technic of integral images at the level of the neighborhood N(p) of pixel p.

2.5.2 Integral Image at the Level of the Whole Image

We first compute the following quantity:

$$\rho'(p, q) = \sum_{x=-M+1}^{0} (I(p + (x, 0)) - I(q + (x, 0)))^2$$

for all pixels p in the image and for all pixels q∈N(p).

To compute it efficiently we use the following recurrence $\rho'(p,q)=\rho'(p-(1,0),q-(1,0))+(I(p)-I(q))^2-(I(p-(M,0))-I(q-(M,0)))^2$ Then $$\delta(p, q, 0, 0) = \sum_{y=-M+1}^{0} \rho'(p + (0, y), q + (0, y))$$

To compute efficiently δ(p, q) for all pixel p in the image and for all q∈N(p) we use the following recurrence $$\delta(p,q,0,0) = \delta(p-(0,1), q-(0,1), 0, 0) + \rho'(p,q) - \rho'(p-(0,M), q-(0,M))$$

Now δ(p, q, i, j) does not require any additional computation because δ(p,q,i,j)=δ(p+(j,i),q+(j,i),0,0), so all δ(p,q,i,j) for all i, j∈{0, . . . ,M−1}, all pixels p and all pixels q ∈ N p) are precomputed with computational complexity $\Theta(N_{pix})$. Finally, using those precomputed δ(p,q,i,j), the number of floating point operations is $\Theta(N_{pix}K^2)$. The number of comparisons is still $\Theta(N_{pix}K^2M^2)$ though, because $$d(p, q)^2 = \max_{i,j \in \{0,\ldots,M-1\}} \delta(p, q, i, j)$$

requires to loop over i, j∈{0, . . . , M−1} even though the δ(p, q, i, j) are precomputed.

2.6 Ranges for Parameters

We give ranges of useful values for the parameters of the algorithm: K, M and h. For parameter h give one range for the case where an Anscombe transform has been applied to the input image before denoising on one hand and one range for the case where the Anscombe transform is not used assuming the pixel values are normalized in the range [0, 1]. For each parameter we give three nested ranges of increasing length from preferred to less preferred. However it should be noted that those ranges are only indicative and the preferred values for the parameters depends on the camera, the rest of the ISP (image signal processor), the computational budget available, and the lighting conditions.

Then choose h∈[0.2,1.5]. Provided no transform has been applied and the range of the input image is [0, 1] then choose h∈[0.001,0.3].

2.6.1 Preferred Ranges

In some preferred embodiments a value of K is chosen from a range of about 5 to 8 and a value of M is chosen from a range of about 2 to 3. Provided an Anscombe transform has been applied to the raw image 104, a value of h is chosen from a range of about 0.2 to 1.5; otherwise a value of h is chosen from a range of about 0.001 to 0.2.

2.6.2 Other Preferred Ranges

In other preferred embodiments a value of K is chosen from a range of about 3 to 12 and a value of M is chosen from a range of about 2 to 4. Provided an Anscombe transform has been applied to the raw image 104, a value of h is chosen from a range of about 0.1 to 2.5; otherwise a value of h is chosen from a range of about 0.001 to 0.3.

2.6.3 Still Other Preferred Ranges

In still other preferred embodiments a value of K is chosen from a range of about 1 to 16 and a value of M is chosen from a range of about 2 to 5. Provided an Anscombe transform has been applied to the raw image 104, a value of h is chosen from a range of about 0.01 to 4; otherwise a value of h is chosen from a range of about 0.001 to 0.2.

3.0 High Frequency Artifact Removal Filter

A denoised image may exhibit some high frequency artifacts in each of the Bayer channels. We present here a high frequency filter module 218, see FIG. 2, that attenuate those artifacts while still preserving the details of the image. It is similar to the demosaic artifact suppression filter described herein below, but applied independently on each Bayer channel.

3.1 Filter Description

We now give the details of that high frequency artifact removal filter 218. We first define an image guide for the filter as follows. For each pixel p=(x, y) of the image I that enters the filter, we note:

$$Z(x,y,1) = I(x,y) + I(x+2,y) + I(x,y-2) + I(x+2,y-2)$$

$$Z(x,y,2) = I(x,y) + I(x-2,y) + I(x,y+2) + I(x-2,y+2)$$

$$Z(x,y,3) = I(x,y) + I(x+2,y) + I(x,y+2) + I(x+2,y+2)$$

We note Z(p) the 4D vector (Z(x, y, k), k∈{0,1,2,3}), the filtered value is then:

$$z = \frac{1}{C(p)} \sum_{q \in N(p)} I(q) w_{hf}(p, q) \text{ with } C(p) = \sum_{q \in N(p)} w_{hf}(p, q)$$

$$N(p) = \{p + 2(i, j); -M \le i, j \le M\}$$

and with $w_{hf}(p, q) = \exp\left(\frac{-|Z(p) - Z(q)|^2}{\rho^2}\right)$ where

|·| denotes the Euclidean norm.

3.2 Physical Interpretation of the Filter

The action of the filter 218 is modulated by the weights $w_{hf}$ and those weights decrease with the distances |Z(p)−Z(q)|. Now those distances are based on Z which is box filtered. This box filtering makes the distance insensitive to Nyquist frequency. So the modulation of the filter 218 ignores the highest frequency. This explain why medium and lower frequencies are preserved while higher frequencies are filtered more strongly. The filter 218 needs to be used with a strength typically lower than the previous denoiser, because otherwise all details in the highest frequencies are lost.

3.3 Ranges for Parameters

For parameter ρ we consider two cases:
Case A. Input image had Anscombe transform applied and the filter is applied before the inverse Anscombe transform.
Case B. Anscombe transform is not used and input image normalized in [0, 1].

3.3.1 Preferred Ranges

In some preferred embodiments a value of M is chosen from a range of about 1 to 2. Provided an Anscombe transform has been applied to the raw image 104 (Case A), a value of p is chosen from a range of 0.003 to 0.03; otherwise (Case B) a value of p is chosen from a range of 0.0001 to 0.001.

3.3.2 Other Preferred Ranges

In other preferred embodiments a value of M is chosen from a range of about 1 to 2. Provided an Anscombe transform has been applied to the raw image 104 (Case A), a value of p is chosen from a range of 0.001 to 0.05; otherwise (Case B) a value of p is chosen from a range of 0.0001 to 0.003.

3.3.3 Still Other Preferred Ranges

In other preferred embodiments a value of M is chosen from a range of about 1 to 4. Provided an Anscombe transform has been applied to the raw image 104 (Case A), a value of p is chosen from a range of 0.001 to 0.1; otherwise (Case B) a value of p is chosen from a range of 0.0001 to 0.01.

4.0 Demosaic Artifact Suppression in Digital Images

A system 400 for demosaic artifact suppression in digital images of another embodiment of the invention is shown in FIG. 4. The system 400 of FIG. 4 is similar to the system 100 of FIG. 1, except for the additional Demosaic Module 402, and the Demosaic Artifact Suppression Module 406 replacing the CFA Pattern Aware Denoising Module 106, and reference numerals in FIG. 4 are repeated from FIG. 1 for illustrating similar elements.

The system 100 comprises a Raw Image Acquisition Device 112, for example a digital camera, image scanner or motion picture film scanner comprising an image sensor device 114 such as CCD or CMOS image sensor, for acquiring a raw image 104. The raw image 104 contains minimally processed data from the image sensor 114, in a raw image format.

The acquired raw image 104 is supplied to an Image Processing Module 102 comprising a Demosaic Module 402, outputting a demosaiced image 404, and a Demosaic Artifact Suppression Module 406 for processing the demosaiced image 404 into a corrected image 408.

The Image Processing Module 102, the Demosaic Module 402 and the Demosaic Artifact Suppression Module 406 are stored in a memory device 118 and comprise computer executable instructions stored in the memory device 118 for execution by a hardware processor 110. The Demosaic Artifact Suppression Module 406 outputs the corrected image 408 through a Corrected Image Output Module 410 which contains computer readable instructions stored in a memory (not shown) and is responsible for storage or further processing of the corrected image 408 or transmission of the corrected image 408 over a network.

Figure 5:
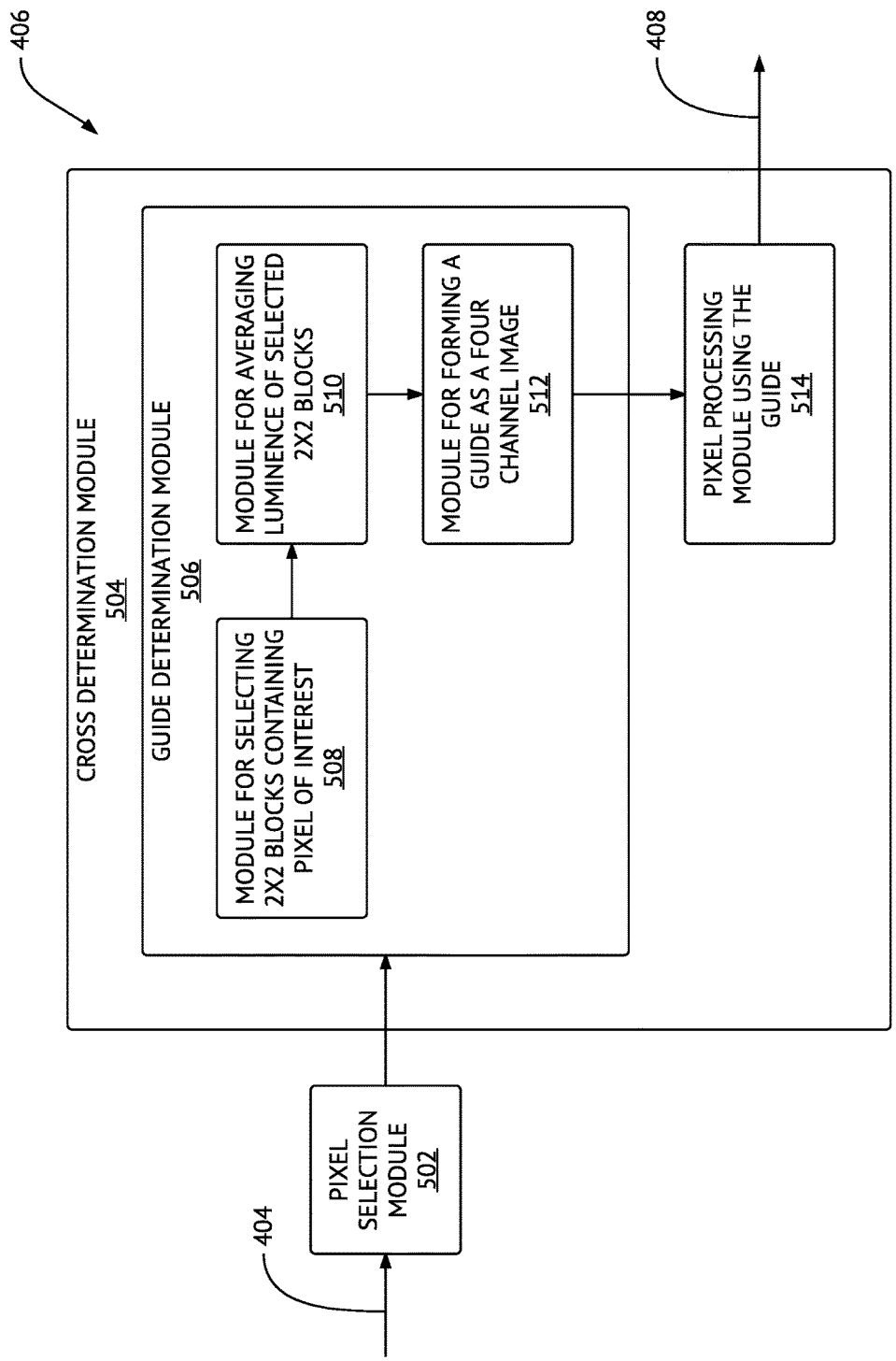
FIG. 5 illustrates a Demosaic Artifact Suppression Module of FIG. 4 in more detail.

FIG. 5 shows the Demosaic Artifact Suppression Module 406 of FIG. 4 in more detail. In the embodiment of the invention, the CFA is a Bayer's filter.

The Demosaic Artifact Suppression Module 406 comprises a Pixel Selection Module 502 for selecting a pixel of interest for processing, and an Improved Cross Bilateral Filter 504, which is a guided filter. The Improved Cross Bilateral Filter 504 comprises a Guide Determination Module 506 for determining a guide, or a special image, for applying in the Improved Cross Bilateral Filter 504 of the embodiment of the invention, and a Pixel Processing Module 514 using the determined guide.

The Guide Determination Module 506 comprises a module for selecting 2×2 blocks of pixels containing a pixel "p" of interest; a Module for averaging the luminance of the selected 2×2 blocks of pixels 510; and a Module for forming the guide as a four channel image 512.

In the embodiment of the invention, assuming that a Bayer's filter is used for the acquisition of the raw image 104, there will be four blocks of 2×2 pixels which contain the pixel "p" of interest.

Denoting p1, p2, p3, p4, p5, p6, p7 and p8 pixels neighboring the pixel "p" of interest, and Y(q) the luminance of any pixel q, we can define the computation of the 4-dimensional component of the Guide for the pixel "p" as presented in FIG. 5A1, FIG. 5A2, FIG. 5A3 and FIG. 5A4.

An average luminance for each of these four blocks of 2×2 pixels (corresponding to the pixel "p" of interest and containing the pixel "p") is determined (L1p, L2p, L3p and L4p), and the values of the average luminance for these blocks of 2×2 pixels are used as component of a 4-dimensional vector.

According to FIG. 5A1, the average luminance L1p is defined based on 2×2 pixels p1, p2, p4 and p as follows:

$$L1p=(Y(p1)+Y(p2)+Y(p4)+Y(p))/4$$

According to FIG. 5A2, the average luminance L2p is defined based on 2×2 pixels p2, p3, p5 and p as follows:

$$L2p=(Y(p2)+Y(p3)+Y(p)+Y(p5))/4$$

According to FIG. 5A3, the average luminance L3p is defined based on 2×2 pixels p4, p6, p7 and p as follows:

$$L3p=(Y(p4)+Y(p)+Y(p6)+Y(p7))/4$$

According to FIG. 5A4, the average luminance L4p is defined based on 2×2 pixels p5, p7, p8 and p as follows:

$$L4p=(Y(p)+Y(p5)+Y(p7)+Y(p8))/4$$

The same procedure is repeated for all pixels in the demosaiced image, forming a 4-channel image, or a 4-dimensional vector with components (L1p, L2p, L3p, L4p) for each pixel, thus forming a Guide for use in the guided Improved Cross Bilateral Filter 504.

It should be noted that rather than the average luminance, the sum of the luminances could be used as effectively.

It is understood that other types of CFA are also possible, and the Cross Bilateral Filter may be substituted by Non-Local Means filter or another filter suitable for processing a demosaiced image. If using a filter other than the cross bilateral, the previously defined guide should be used for computing the weights between pixels, rather than the image itself.

The Pixel Selection Module 502, and the Improved Cross Bilateral Filter 504 including its modules 506 and 514 comprise computer readable instructions stored in a memory for execution by the hardware processor 110.

Figure 6:
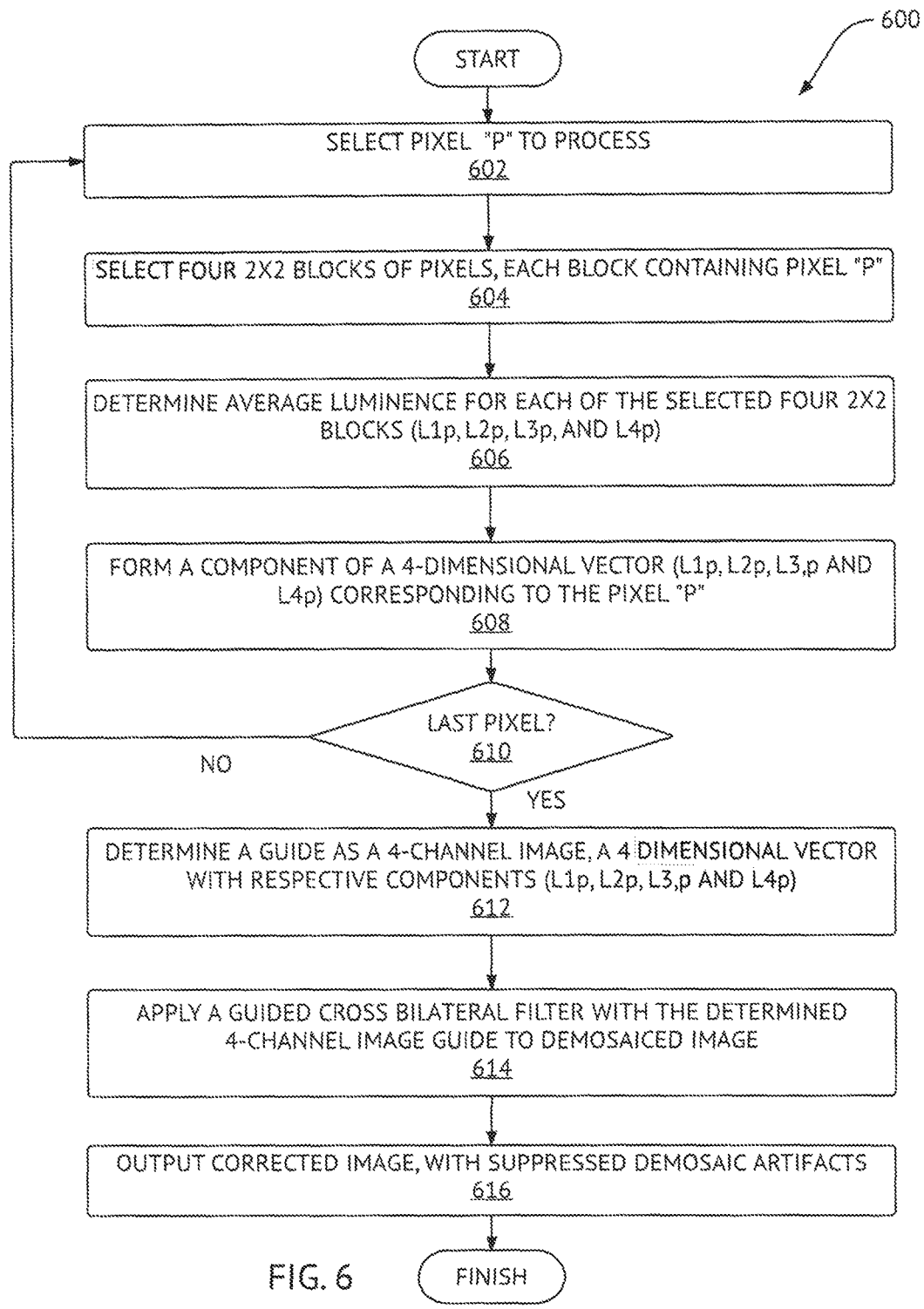
FIG. 6 shows a flowchart illustrating a method for demosaic artifact suppression in digital images according to the yet another embodiment of the present invention.

The method for demosaic artifact suppression in digital images of the embodiment of the invention is illustrated by a flowchart 600 of FIG. 6.

Upon obtaining the demosaiced image 404 from the Demosaic Module 402, the method selects a pixel "p" in the demosaiced image 404 to process (box 602).

Next, four 2×2 blocks of pixels are selected, containing the pixel "P" of interest (box 604), followed by determining an average luminance for each of the four selected blocks (box 606), the average luminance for each of the selected four blocks being designated as L1p, L2p, L3p and L4p.

Next, a 4D component of a 4-dimensional vector is formed, corresponding to the pixel "p", the 4D component of the 4-dimensional vector comprising the average luminance for the selected four blocks (L1p, L2p, L3p, L4p).

Provided the pixel "p" is not the last pixel in the demosaiced image 404 (exit "No" from box 610), the method returns back to the box 602 for processing the next pixel.

Provided the pixel "p" is the last pixel in the demosaiced image 404 (exit "Yes" from box 610), the method proceeds to determining an improved Guide of the embodiment of the invention (box 612), which is a complete 4-dimensional vector comprising multiple 4D components, corresponding to individual pixels in the demosaiced image 404. We will also refer to the 4-dimensional vector as a 4-channel image, or also as an image Guide, to be used in a guided Cross Bilateral Filter as described below.

The improved Guide of the embodiment of the invention, which has been determined in box 612, is used in the Cross Bilateral Filter (box 614), which is applied to the demosaiced image 404 (box 614).

The guided Cross Bilateral Filter with the improved Guide outputs the corrected image 408 through the Corrected Image Output Module 410 (box 616), followed by the termination of the method.

4.1 Method for Demosaic Artifact Suppression

The method for demosaic artifact suppression of the embodiment of the invention has been described assuming that the pattern of the color filter array is 2 pixels by 2 pixels square, and the image has 3 color channels, red, green and blue. This is the case for instance for the Bayer pattern filter.

Let $I=(I_R,I_G,I_B)$ be the demosaiced color image 404 to correct for demosaicing artifacts and Y its luminance.

For any pixel p=(x,y) we define:

$$Z(x,y,0)=Y(x,y)+Y(x-1,y)+Y(x,y-1)+Y(x-1,y-1)$$

$$Z(x,y,1)=Y(x,y)+Y(x-1,y)+Y(x,y-1)+Y(x-1,y-1)$$

$$Z(x,y,2)=Y(x,y)+Y(x-1,y)+Y(x,y+1)+Y(x-1,y+1)$$

$$Z(x,y,3)=Y(x,y)+Y(x+1,y)+Y(x,y+1)+Y(x+1,y+1)$$

For any pixel p=(x,y), we note Z(p) the 4D vector $(Z(x,y,k), k \in \{0,1,2,3\})$. Z is the improved guide of the embodiment of the invention, which is used for performing a cross bilateral filtering on the demosaiced image 121. The coefficients/components of the vector Z(p) are the average luminance of each of the four 2×2 blocks that contain the pixel p.

The RGB image is then filtered with a cross bilateral filter or any of its variations, guided with the 4 channel image Z. Further details are provided below.

Let $I_i(p)$ be the intensity value at pixel p for the channel $i \in \{R,G,B\}$.

Let $\hat{I}$ be the filtered image. Then for each pixel p, for each color channel $i \in \{R,G,B\}$, the value of the filtered image at pixel p and for channel i is defined as follows:

$$\hat{I}_i(p) = \frac{1}{W_p} \sum_{q \in P(I)} w(p,q) I_i(q)$$

where:

P(I) is the set of all pixels in the image.

$w(p,q) = r_Z(p,q) s(p,q)$ is the weight of pixel q to filter pixel p.

$r_Z$ is the range kernel, guided by Z. It measures the similarity of the features in the guide Z for pixels p and q, usually it is takes the following form:

$$r_Z(p,q) = \exp\left(-\frac{\|Z(p)-Z(q)\|^2}{\rho^2}\right).$$

s is the space kernel. It measures how close in space in the image the pixels p and q are. Usually it is chosen as:

$$s(p,q) = \exp\left(-\frac{\|p-q\|^2}{\sigma^2}\right),$$

another common choice is the step function: $s(p,q)=\delta(|x_p-x_q|<k)\delta(|y_p-y_q|<k)$, where $p=(x_p,y_p)$ and $q=(x_q,y_q)$, which is equal to 1 when $|x_p-x_q|<k$ and $|y_p-y_q|<k$, and equal to 0 otherwise.

$$W_{p=q \in P(I)} \sum w(p,q)$$

is a normalizing factor.

Remarks:

1. Assuming the range of the image is [0,1], typical values for the parameters above are: $\rho=5 \cdot 10^{-4}$, $\sigma=4$, k=4, which may be tuned appropriately for better results depending on the input.

2. The summation over $q \in P(I)$ above can be simplified in practice to a smaller domain $q \in B(p)$, where $B=(p)=\{q=p+(x,y)|-b<x,y<b\}$ with b=3σ or b=k depending on which space kernel s is chosen.

3. Any fast implementation of the bilateral filter, or variations around the bilateral filter, that allows to do guided filtering, can be used to compute $\hat{I}$. The only requirement is that the 4 channel image Z defined above is used as the guide. Examples of such fast implementations include: the bilateral grid described in "*Real-Dime Edge-Aware Image Processing With The Bilateral Grid,*" J. Chen, S. Paris, and F. Durand, ACM Transactions on Graphics (Proc. SIG-GRAPH 07), page 103, 2007, the permutohedral lattice described in "*Fast High-Dimensional Filtering Using The Permutohedral Lattice,*" A. Adams, J. Baek, and M. A. Davis, Computer Graphics Forum (Proc. Eurographics), 2010, the Gaussian kd-trees filter described in "*Gaussian Kd-ITees For Fast High-Dimensional Filtering,*" A. Adams, N. Gelfand, J. Dolson, and M. Levoy, ACM Transactions on Graphics (Proc. SIGGRAPH 09), pages 1-12, 2009, the domain transform recursive filter described in "*Domain Transform For Edge-Aware Image And Video Processing,*" E. S. L. Gastal, M. M. Oliveira. ACM TOG 30, 4 (2011), 69:1-69:12 the adaptive manifold filter described in "*Adaptive Manifolds For Real-Time High-Dimensional Filtering,*" E. S. L. Gastal, M. M. Oliveira, ACM TOG 31, 4 (2012), 33:1-33:13. Proceedings of SIGGRAPH 2012.

Thus, an improved method and system for demosaic artifact suppression in digital image have been provided.

5.0 Edge Denoising

Figure 7:
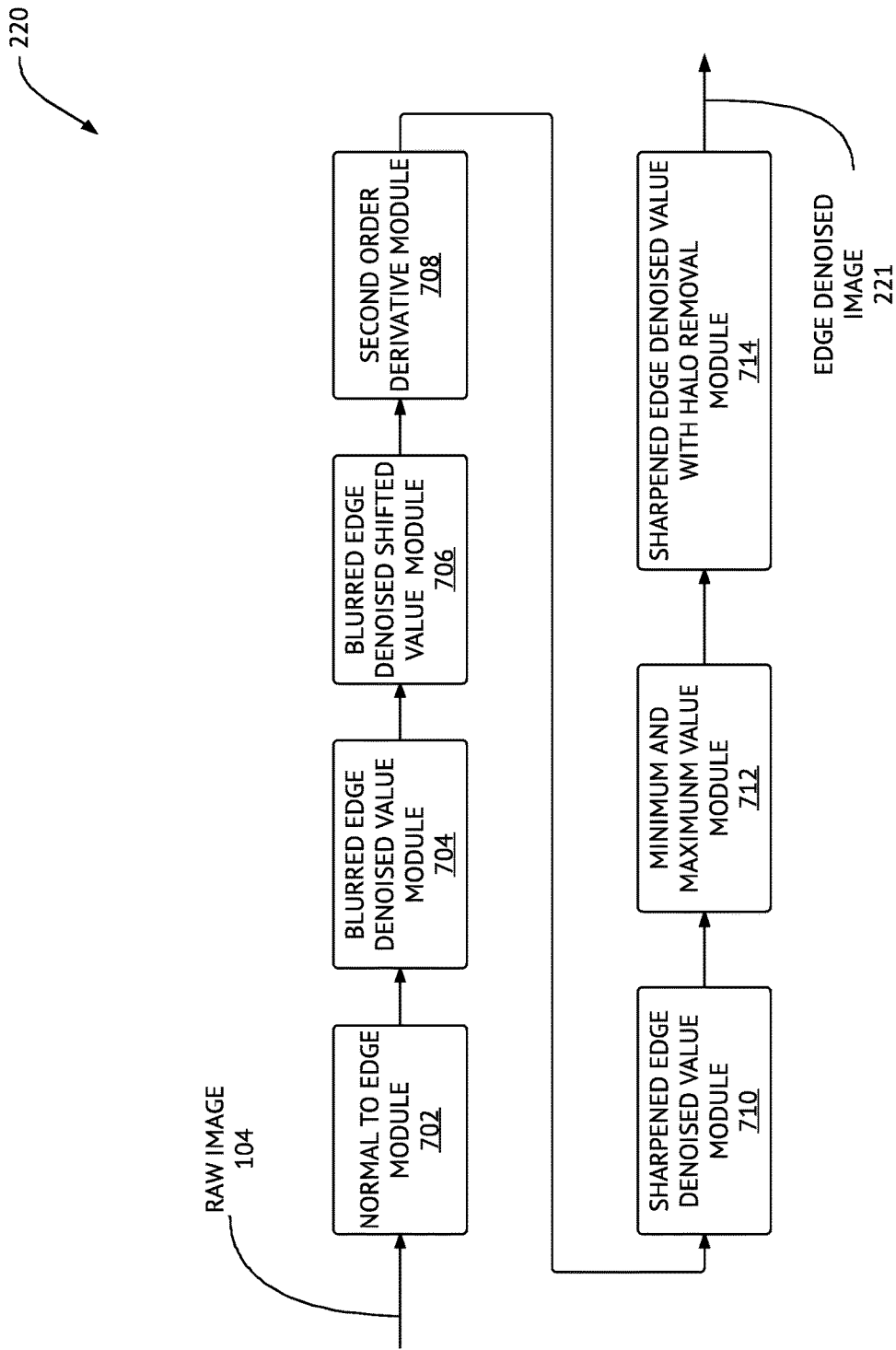
FIG. 7 illustrates a block diagram of an edged denoising module of FIG. 2 in more detail.
Figure 8A:
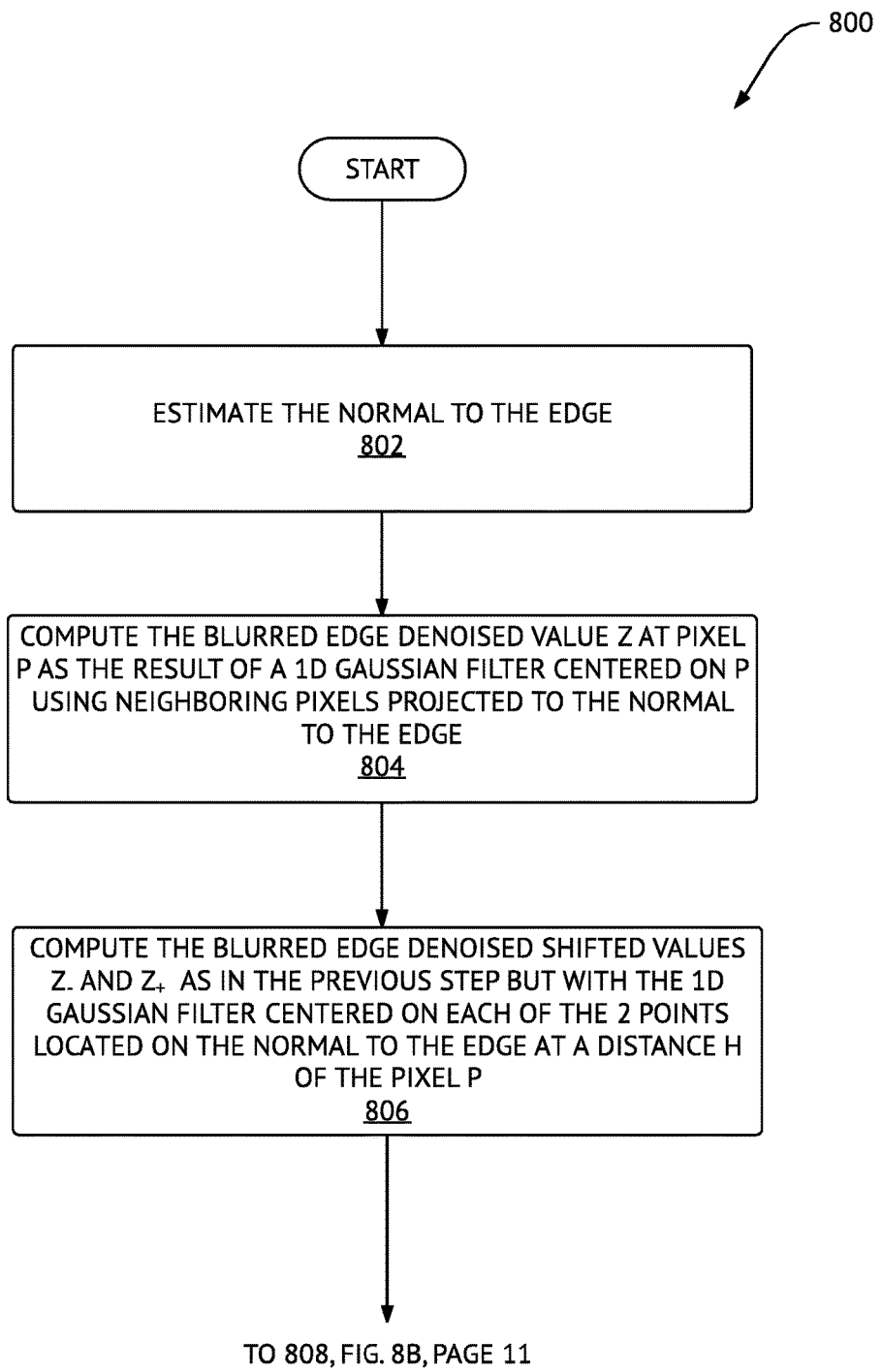
FIG. 8A is a first part of a flowchart illustrating a method for edge denoising in digital images according to another embodiment of the invention.
Figure 8B:
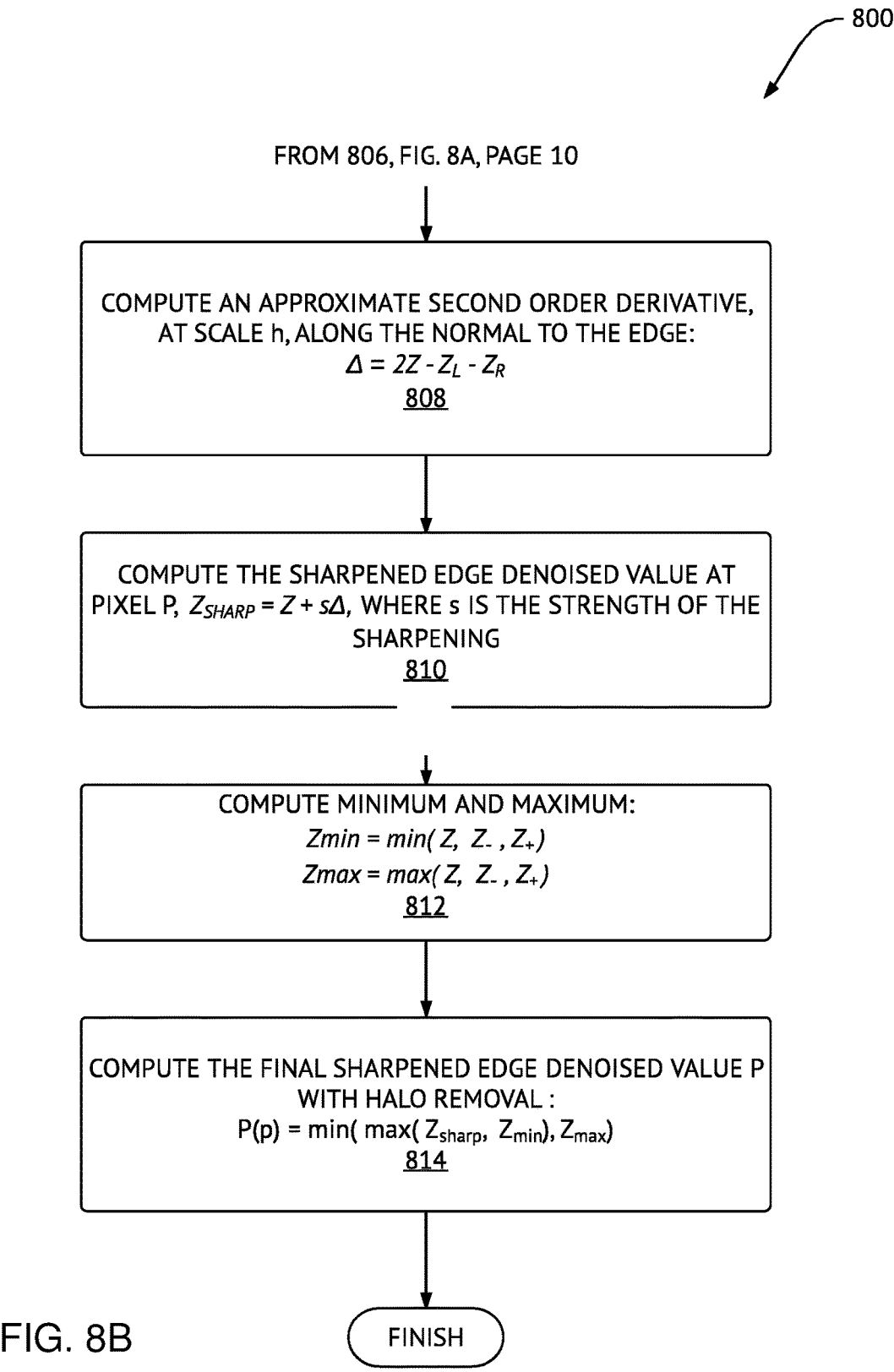
FIG. 8b is a second part of the flowchart illustrating the method for edge denoising in digital images.

We now describe the edge denoising module 220 of FIG. 2 with reference to the block diagram 220 of FIG. 7 and the flowchart 800 shown in FIG. 8A and FIG. 8B. The edge denoising module 220 denoises strong edges on the raw image 104 to produce an edge denoised image 221. It is preferably run in parallel with the texture preserving raw image denoiser filter 202,206,210,214,218 described above. Then the results of the two filters, the textured preserved denoised image 219 and the edge denoised image 221, are blended together in an image blending model 222 to produce the denoised image 108 as described herein below.

Referring the block diagram of FIG. 7, the edge denoising module 220 includes:

a Normal to Edge Module 702 for estimating the normal to the edge of each pixel p in the raw image 104, box 702. (details described below, section 5.1)

a Blurred Edge Denoised Value Module 704 for computing the blurred edge denoised value z at pixel p as the result of a 1D Gaussian filter centered on p using neighboring pixels projected to the normal to the edge. (details described below, section 5.2)

a Blurred Edge Denoise Shifted Value Module 706 for computing the blurred edge denoised shifted values $z_-$ and $z_+$ as in the previous module 704 but with the ID Gaussian filter centered on each of the 2 points located on the normal to the edge at a distance h of the pixel p. (details described below, section 5.3)

a Second Order Derivative Module 708 for computing an approximate second order derivative, at a scale h, along the normal to the edge (details described below, section 5.4).

a Sharpened Edge Denoised Value Module 710 for computing the sharpened edge denoised value, $z_{sharp}$, at pixel p (details described below, section 5.5).

a Minimum and Maximum Value Module 712 for computing minimum and maximum values, $z_{min}$ and $z_{max}$, at pixel p (details described below, section 5.6).

a Sharpened Edge Denoised Value Halo Removal Module 714 for computing the final sharpened edge denoised value $\tilde{I}(p)$ (details described below, section 5.7).

Figure 16:
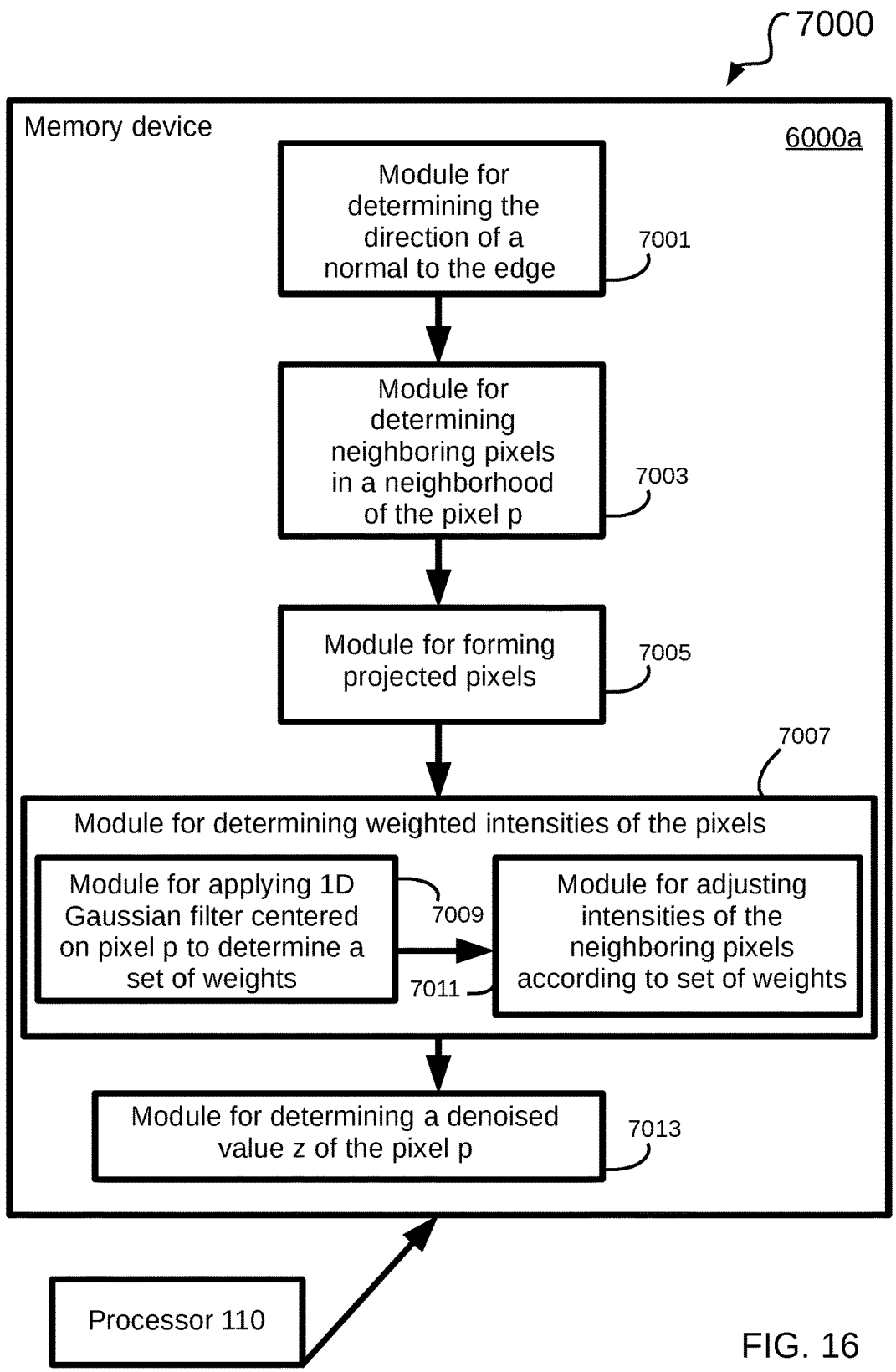
FIG. 16 is a block diagram illustrating a system of denoising an edge in a raw image according to another embodiment of the invention.

FIG. 16 shows a system 7000 for denoising an edge in a raw image, the edge comprising a pixel p, the system comprising a memory device 6000*a* having computer readable instructions stored thereon for execution by a hardware processor 110, including a module 7001 for determining a direction of a normal to the edge near the pixel p, a module 7003 for determining neighboring pixels in a neighborhood of the pixel p, a module 7005 for forming projected pixels by projecting the neighboring pixels to the normal to the edge, a module 7007 for determining weighted intensities of the neighboring pixels, which includes two modules: a module 7009 for determining a set of weights, comprising applying a one dimensional, 1D, Gaussian filter centered on the pixel p and acting on the projected pixels, and a module 7011 for adjusting intensities of the neighboring pixels according to the set of weights, and a module 7013 for determining a denoised value z of the pixel p using the weighted intensities, thereby denoising the edge of the raw image expediently.

Figure 17:
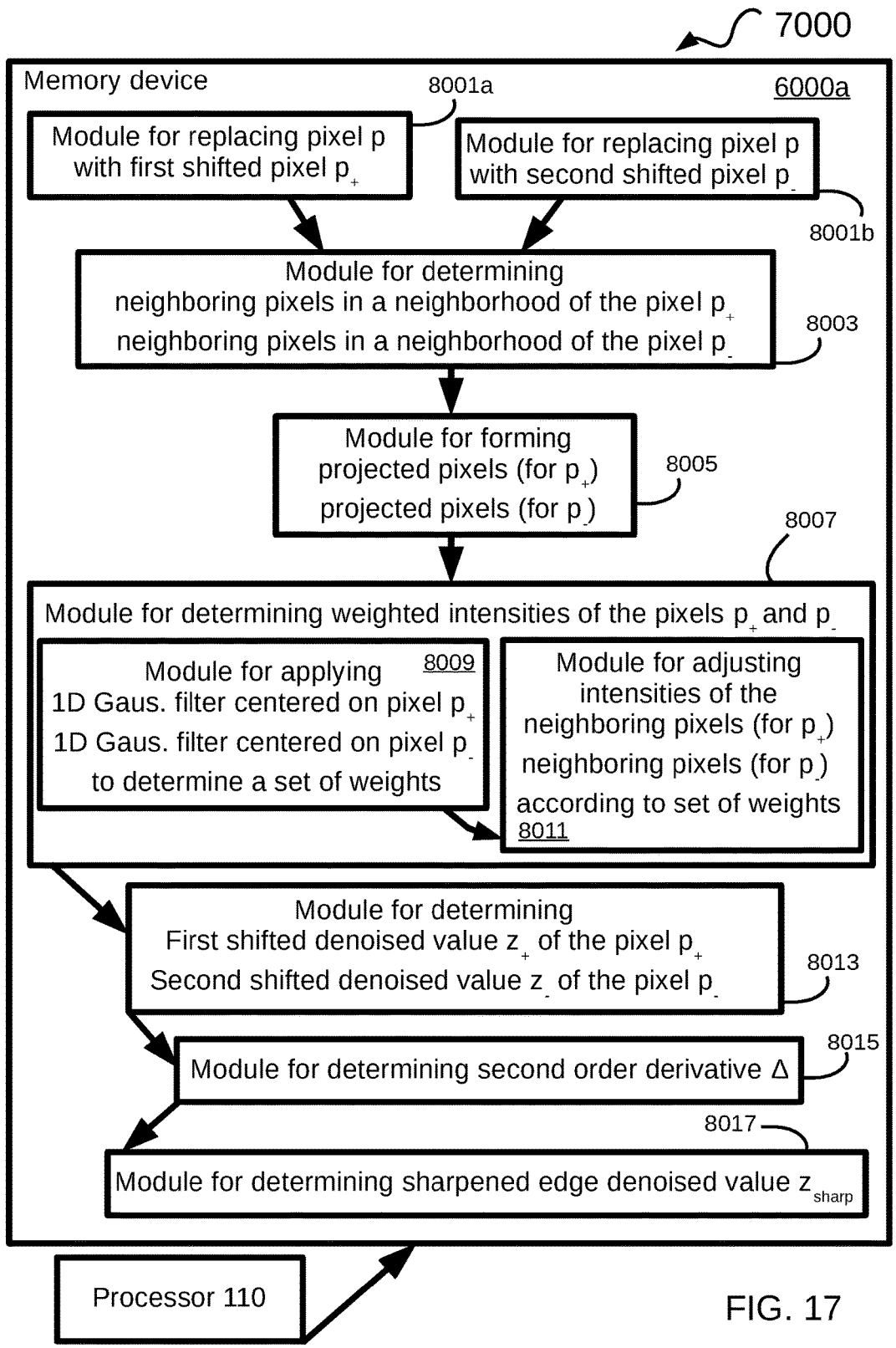
FIG. 17 is a block diagram illustrating additional elements of a system of denoising an edge in a raw image, as originally shown in FIG. 16.

The system 7000 of FIG. 16 comprises additional elements, which are shown in FIG. 17. The computer readable instructions of the memory device 6000*a* of system 7000 further include a module 8001*a* for replacing the pixel p with respective first shifted pixel $p_+$ at a first distance from the pixel p along the normal to the edge, on a brighter side of the edge, and a module 8001*b* for replacing the pixel p with respective second shifted pixel $p_-$ at a second distance from the pixel p along the normal to the edge, on a darker side of the edge, a module 8003 for determining neighboring pixels in a neighborhood of the pixel $p_+$ and neighboring pixels in a neighborhood of the pixel $p_-$, a module 8005 for forming projected pixels (for $p_-$) and forming projected pixels for ($p_+$) by projecting the neighboring pixels to the normal to the edge, a module 8007 for determining weighted intensities of the neighboring pixels $p_+$ and $p_+$, which includes two modules: a module 8009 for determining a set of weights, comprising applying a one dimensional, 1D, Gaussian filter centered on the pixel p+, and applying a one dimensional, 1D, Gaussian filter centered on the pixel $p_+$, and acting on the projected pixels (for $p_+$ and for $p_-$), and a module 8011 for adjusting intensities of the neighburing pixels (for $p_+$ and for $p_-$) according to the set of weights, a module 8013 for determining a first shifted denoised value $z_+$ and a second shifted denoised value $z_-$, a module 8015 for determining a second order derivative $\Delta$ along the normal to the edge, based on the first and second shifted denoised values $z_-$ and $z_+$ and a distance between the pixels $p_+$ and $p_-$, and a module 8017 for determining a sharpened edge denoised value $z_{sharp}$ of the pixel p, comprising adjusting the denoised value z proportionately to the second order derivative $\Delta$.

There is also another system of denoising an edge in a raw image, the edge comprising a pixel p. The system has a means for determining a direction of a normal to the edge, a means for determining neighboring pixels in a neighborhood of the pixel p, a means for projecting the neighboring pixels to the normal to the edge, forming projected pixels. There is also a means for determining weighted intensities of the neighboring pixels, which has a means for determining a set of weights, comprising applying a one dimensional, 1D, Gaussian filter centered on the pixel p and acting on the projected pixels, and a means for adjusting intensities of the neighboring pixels according to the set of weights. Finally there is a means for determining a denoised value z of the pixel p using the weighted intensities, thereby denoising the edge of the raw image expediently.

Remarks:
- The 1D Gaussian filter of Blurred Edge Denoised Value Module 704 is parameterized by a standard deviation $\sigma$ which can be increased to get stronger denoising and conversely (a typical value would be 1.5 or 2). Values larger than 2 usually blur the edge too much, such that the sharpening that is applied later is not sufficient to recover a sharp edge without sharpening artifacts. Larger values might still be useful in cases of very strong noise where it could be acceptable to trade off sharpness against denoising, i.e. having a denoised edge at the price of blurrier edges. Values smaller than 1.5 usually lead to insufficient denoising for moderate amount of noise or larger, however might still be useful in case of low noise. The right value of $\sigma$ doesn't depend on the image itself but rather on the amount of noise and on the sharpness of the lens used to take the picture, such that a value of $\sigma$ that works well for some representative set of test images all taken with the same camera and roughly the same amount of light (i.e. having roughly the same amount of noise), will work for any picture taken with the same camera and having roughly the same amount of noise. To know a good value of $\sigma$ for any image, first a good value for each level of noise must be found, and then the value corresponding to the amount of noise present in the image to be processed, must be picked.
- The parameters h and s in the Blurred Edge Denoise Shifted Value Module 706 and the Sharpened Edge Denoised Value Module 710 are parameters of the edge denoising filter to be chosen.
- The filtering done in the Blurred Edge Denoised Value Module 704 creates some amount of blur in z. The subsequent modules act as a sharpener. That sharpening effect can be limited to just cancel the blur introduced in the Blurred Edge Denoised Value Module 704, or go even further and produce a sharpened denoised edge. Increasing h and s increases the sharpening effect and conversely. Example of values that would cancel the blur introduced in the Blurred Edge Denoised Value Module 704 but not increase sharpness are h=2 and s=0.6.
- The sharpened edge denoised value $z_{sharp}$ may produce black or white halos around the edge, the Minimum and Maximum Value Module 712 and Sharpened Edge Denoised Value Halo Removal Module 714 mitigate this undesirable effect.
- The technique requires computation of the normal to the edge. It is not sufficient to only compute a gradient. The difference with a gradient and a normal vector, is that the normal vector is normalized (it has norm=1). The normal (normal vector) is computed by dividing the gradient by its norm. The gradient cannot be used when doing the projection (i.e. when the dot product is computed), the vector needs to be normalized.
- It is also important to emphasize that the gradient cannot simply be computed with the usual small support filters (i.e. $[-1\ 1]$ and $[-1\ 1]^T$). The reason is because we are actually not interested in the gradient of the noisy image, but of the latent noiseless image, such that that the gradient must be estimated in a way that is robust to noise, which is not possible with the small support filters.

5.1. Estimating 802 of the Normal to the Edge

5.1 (a) The linear Filters

Using the normal to edge module 702, the normal to the edge is estimated 802 with the help of the following linear filters, which are applied to the array of pixels intensities.

$$K_x = \begin{bmatrix} -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & 0 & -1 & 0 & 0 & 0 & 1 & 0 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \end{bmatrix}$$

$$K_y = \begin{bmatrix} -1 & -1 & -1 & -1 & -1 & -1 & -1 & -1 & -1 \\ -1 & -1 & -1 & -1 & 0 & -1 & -1 & -1 & -1 \\ -1 & -1 & -1 & -1 & -1 & -1 & -1 & -1 & -1 \\ -1 & -1 & -1 & -1 & 0 & -1 & -1 & -1 & -1 \\ 0 & 0 & 0 & 0 & 0 & 0 & 0 & 0 & 0 \\ 1 & 1 & 1 & 1 & 0 & 1 & 1 & 1 & 1 \\ 1 & 1 & 1 & 1 & 1 & 1 & 1 & 1 & 1 \\ 1 & 1 & 1 & 1 & 0 & 1 & 1 & 1 & 1 \\ 1 & 1 & 1 & 1 & 1 & 1 & 1 & 1 & 1 \end{bmatrix}$$

$$K_z = \begin{bmatrix} 0 & 1 & 1 & 1 & 1 & 1 & 1 & 1 \\ -1 & 0 & 1 & 1 & 1 & 1 & 1 & 1 \\ -1 & -1 & 0 & 1 & 1 & 1 & 1 & 1 \\ -1 & -1 & -1 & 0 & 1 & 1 & 1 & 1 \\ -1 & -1 & -1 & -1 & 0 & 1 & 1 & 1 \\ -1 & -1 & -1 & -1 & -1 & 0 & 1 & 1 \\ -1 & -1 & -1 & -1 & -1 & -1 & 0 & 1 \\ -1 & -1 & -1 & -1 & -1 & -1 & -1 & 0 \end{bmatrix}$$

$$K_w = \begin{bmatrix} -1 & -1 & -1 & -1 & -1 & -1 & -1 & -1 & 0 \\ -1 & -1 & -1 & -1 & -1 & -1 & -1 & 0 & 1 \\ -1 & -1 & -1 & -1 & -1 & -1 & 0 & 1 & 1 \\ -1 & -1 & -1 & -1 & -1 & 0 & 1 & 1 & 1 \\ -1 & -1 & -1 & -1 & 0 & 1 & 1 & 1 & 1 \\ -1 & -1 & -1 & 0 & 1 & 1 & 1 & 1 \\ -1 & -1 & 0 & 1 & 1 & 1 & 1 & 1 \\ -1 & 0 & 1 & 1 & 1 & 1 & 1 & 1 \\ 0 & 1 & 1 & 1 & 1 & 1 & 1 & 1 \end{bmatrix}$$

5.1 (b) What does Each Linear Filter Represent?

Each of the above noted linear filters computes an estimate of the discrete gradient of pixels intensity projected onto a direction. These estimates are robust to noise because of their large supports. $K_x$ estimates the gradient projected onto the x-axis, $K_y$ estimates the gradient projected onto the y-axis, $K_z$ estimates the gradient projected onto the x-axis rotated by 45 degree (pi/4 rad), and $K_w$ estimates the gradient projected onto the x-axis rotated by −45 degree (−pi/4 rad).

It is understood that various other projection angles apart from 45 degree may be also used if required.

There is a redundancy in estimating in four directions while the gradient has only two components since the image is two-dimensional. The reason of this redundancy is to acquire further robustness to noise: the gradients from $K_x$, $K_y$, and from $K_z$, and $K_w$, are estimated. The average of these two estimates is computed to acquire a robust estimate.

5.1 (c) What does Each Linear Filter Do?

For a pixel on an edge in an image, the gradient of the pixels intensity at the pixel has the same direction as the normal to the edge. This is taken advantage of, to estimate the normal to the edge.

5.1 (d) Balancing of the Linear Filters

The linear filters must be balanced. "Balanced" refers to the structure and population of the linear filters. Namely, there are "0" values in every other coefficient in the central row of $K_x$, and in the central column of $K_y$. If these coefficients were non-zero, then for some color channels the two filters would put non-zero weights to a different number of pixels. It is important that for each color channel the number of pixels with non-zero weight is the same for both filters. Otherwise, the estimate of the direction may be biased because the average intensity may be different from one channel to another.

5.1 (e) the Structure of the Linear Filters

To describe the structure of the linear filter $K_x$, the gradient of the image along the x-axis, without noise, is first computed. This is done by using the linear filter:

$$0.5 \cdot (-1 \; 0 \; 1)$$

i.e. if I(x, y) is the intensity of the pixel at position (x, y), then the gradient is estimated along x, at that same position with:

$$0.5 \cdot (I(x+1,y) - I(x-1,y))$$

In particular, the following is not used: I(x+, y)−I(x, y), nor I(x, y)−I(x−1, y), because these would be the gradient at positions (x+0.5, y) and (x−0.5, y) respectively. For this reason, the filter (−1 1) is not used, but instead the filter (−1 0 1) could be used.

In the case where the image is noisy, the formula $0.5 \cdot (I(x+1, y) - I(x-1, y))$ is a poor estimate of the gradient of the noiseless latent image. A trick to make the estimate more robust is to use more pixels in the neighborhood. Linear filters $K_x$ and $K_y$ are chosen to be large, with the aim of being more robust.

Instead of subtracting I(x−1, y) with I(x+1, y), an average value is subtracted around pixel (x−1, y) with an average value around pixel (x+1, y). This comprises using the formula:

$$\sum_{i=-4,\ldots,4} \sum_{j=1,\ldots,4} I(x+i, y+j) - \sum_{i=-4,\ldots,4} \sum_{j=1,\ldots,4} I(x+i, y-j)$$

The formula amounts to applying the linear filter $K_x$ (except for the few 0s on the middle row, which are a refinement to make the filters balanced). The 0s in the middle column are kept because having 1s, or −1s, in their place would not allow the filter to compute the gradient exactly at position (x, y), but rather a bit further on the left or a bit further on the right of position (x, y).

The explanations for the three remaining linear filters, $K_y$, $K_z$ and $K_w$, are similar, except the structure is rotated according to the direction along which the gradient is estimated.

A normalizing factor in front of the filters is not required because the value of the gradient is not that important, but rather its direction.

5.1 (f) the Application of the Linear Filters to the Raw Digital Image

The raw image is filtered with each of those filters producing images $d_x$, $d_y$, $d_z$ and $d_w$ respectively. Then two estimates of the normal to the edge are computed, with $d_x$ and $d_y$ on one hand and with $d_z$ and $d_w$ on the other hand, represented by the complex numbers $g_{xy}$ and $g_{zw}$ respectively:

$$g_{xy} = d_x + id_y \text{ and } g_{zw} = (d_z + id_w)e^{-i\frac{\pi}{4}} \text{ (where } i = \sqrt{-1}\text{ )}.$$

Those two estimates are normalized and averaged to $$\bar{g} = 0.5\left(\frac{g_{xy}}{|g_{xy}|} + \frac{g_{zw}}{|g_{zw}|}\right)$$

and finally the estimate of the unit vector normal to the edge is $$u = \frac{\bar{g}}{|\bar{g}|}.$$

Remarks:

The size of the filters presented above is 9, but a larger size could be used in the case of very low light (i.e. very high noise), to make the estimate more robust, as long as the filter follows the pattern given here. Conversely a smaller size could be used in the case of moderate noise. Large filters are more robust to noise but computationally more expensive and are less accurate in the case of edges with high curvature.

There are 0 values every other coefficient in the central row of $K_x$ and in the central column of $K_y$ which may look surprising. The reason is if we do not put zero weight at those coefficients then for some color channel the two filters would put non-zero weight to a different number of pixels. As mentioned above, it is important that for each color channel the number of pixels with non-zero weight is the same for both filter, otherwise the estimate of the direction will be biased because the average intensity may be different from one channel to another.

The following is a visualization of that property with filters of size 5, applied to a green pixel:

$$K_x^{[b]} = \begin{bmatrix} -1 & -1 & 0 & 1 & 1 \\ -1 & -1 & 0 & 1 & 1 \\ -1 & -1 & 0 & 1 & 1 \\ -1 & -1 & 0 & 1 & 1 \\ -1 & -1 & 0 & 1 & 1 \end{bmatrix} \quad K_y^{[b]} = \begin{bmatrix} -1 & -1 & -1 & -1 & -1 \\ -1 & -1 & -1 & -1 & -1 \\ 0 & 0 & 0 & 0 & 0 \\ 1 & 1 & 1 & 1 & 1 \\ 1 & 1 & 1 & 1 & 1 \end{bmatrix}$$

$$K_x = \begin{bmatrix} -1 & -1 & 0 & 1 & 1 \\ -1 & -1 & 0 & 1 & 1 \\ -1 & 0 & 0 & 0 & 1 \\ -1 & -1 & 0 & 1 & 1 \\ -1 & -1 & 0 & 1 & 1 \end{bmatrix} \quad K_y = \begin{bmatrix} -1 & -1 & -1 & -1 & -1 \\ -1 & -1 & 0 & -1 & -1 \\ 0 & 0 & 0 & 0 & 0 \\ 1 & 1 & 0 & 1 & 1 \\ 1 & 1 & 1 & 1 & 1 \end{bmatrix}$$

Here $K_k^{(b)}$ put non-zero weight to 4 blue pixels and 6 red pixels while $K_x^{(b)}$ put non-zero weight to 6 blue pixels and 4 red pixels. With $K_x$ and $K_y$ for any color channel the number of pixels with non-zero weight is consistent between the two filters. Finally we do not need to put every other coefficient to zero in the diagonals of $K_w$ and $K_z$ because they readily satisfy the property that for each color channel the number of pixels with non-zero weight is the same for both filter. Moreover, the fact that $K_x$ and $K_y$ on one hand and $K_w$ and $K_z$ on the other hand put non-zero weight to a different number of pixels for some color channel does not matter. The reason is that their respective estimates $g_{xy}$ and $g_{zw}$ are first normalized before being aggregated.

Thus, in summary, the embodiments of the present invention provide a method for edge denoising that is robust to noise.

1. Firstly, we use a fairly large support for the linear filters, i.e. more than two pixels and preferably more.

2. Secondly, projections are made on two sets of axes, getting two estimates, and averaging the two estimates, for increased robustness.

In other words, the discrete gradient is estimated along two sets of axes, the x-axis x and y-axis for filters $K_x$ and $K_y$, and the images of those axes after a rotation by an angle of 45 degrees for example, for filters $K_z$ and $K_w$. As a result, edge denoising becomes more robust.

5.2. Computing 804 of the Blurred Edge Denoised Value z

Using the Blurred Edge Denoised Value Module 704, the blurred edge denoised value z at pixel p is the result of a 1D Gaussian filter centered on p using neighboring pixels projected to the normal to the edge.

More precisely the formula to compute z is:

$$z = \frac{1}{C(p)} \sum_{x=-k}^{k} \sum_{y=-k}^{k} I(p + 2(x, y))w_e(p, x, y) \text{ with}$$

$$C(p) = \sum_{x=-k}^{k} \sum_{y=-k}^{k} w_e(p, x, y)$$

and with $$w_e(p, x, y) = \exp\left(\frac{-(xu_x + yu_y)^2}{2\sigma^2}\right)$$

where $(u_x, u_y) = u$ is the normal to the edge at pixel p estimated previously. The term $(xu_x + yu_y)^2$ is the square of the distance between point p+2(x, y) and the edge. The size of the support of the filter is 4 k+1, k is chosen depending on the desired amount of denoising and the computational budget. When k is larger the denoising is stronger but can accommodate only less curved edges and it requires more computations.

5.3. Computation 806 of the Blurred Edge Denoised Shifted Values $z_-$ and $z_+$ Using the Blurred Edge Denoise Shifted Value Module 706, the formulas to compute $z_-$ and $z_+$ are:

$$z_- = \frac{1}{C_-(p)} \sum_{x=-k}^{k} \sum_{y=-k}^{k} I(p + 2(x, y))w_-(p, x, y) \text{ with}$$

-continued $$C_-(p) = \sum_{x=-k}^{k} \sum_{y=-k}^{k} w_-(p, x, y)$$

$$z_+ = \frac{1}{C_+(p)} \sum_{x=-k}^{k} \sum_{y=-k}^{k} I(p + 2(x, y))w_+(p, x, y) \text{ with}$$

$$C_+(p) = \sum_{x=-k}^{k} \sum_{y=-k}^{k} w_+(p, x, y)$$

and with $w_-(p, x, y) = \exp\left(\frac{-(xu_x + yu_y - h)^2}{2\sigma^2}\right)$ and $$w_+(p, x, y) = \exp\left(\frac{-(xu_x + yu_y - h)^2}{2\sigma^2}\right).$$

The term $(xu_x+yu_y-h)^2$ is the square of the distance between the point p+2(x, y) and the line parallel to the edge at a distance h on the side of the edge that has the brighter pixels, or brighter side of the edge.

The term $(xu_x+yu_y+h)^2$ is the square of the distance between the point p+2(x, y) and the line parallel to the edge at a distance h on the side of the edge that has the darker pixels, or darker side of the edge.

The brighter and darker sides of the edge are determined by using the normal vector. The normal vector to the edge is computed by dividing the gradient by its norm, such that the normal vector points toward pixels of higher intensities, i.e. brighter pixels. As a result, when a dot product is taken of a pixel on the brighter side with the normal vector, the result is positive. Conversely, the dot product of a pixel on the darker side with the normal vector is negative.

5.4 Computing 808 an Approximate Second Order Derivative

Next, compute 808 an approximate second order derivative, at scale h, along the normal to the edge: $\Delta = 2 z - z_l - z_r$.

5.5 Computing 810 the Sharpened Edge Denoised Value at Pixel p

Next, compute 810 the sharpened edge denoised value at pixel p, $z_{sharp} = z + s\Delta$, where s is the strength of the sharpening.

5.6 Computing 812 Minimum and Maximum

Next, compute 814 minimum and maximum values:
$z_{min} = \min\{z, z_-, z_+\}$ and $z_{max} = \max\{z, z_-, z_+\}$.

5.7 Computing 814 the Final Sharpened Edge Denoised Value

Compute the final sharpened edge denoised value with halo removal, box 714:

$$\tilde{I}(p) = \min(\max(z_{sharp}, z_{min}), z_{max})$$

5.8 Method for Edge Denoising

Figure 11:
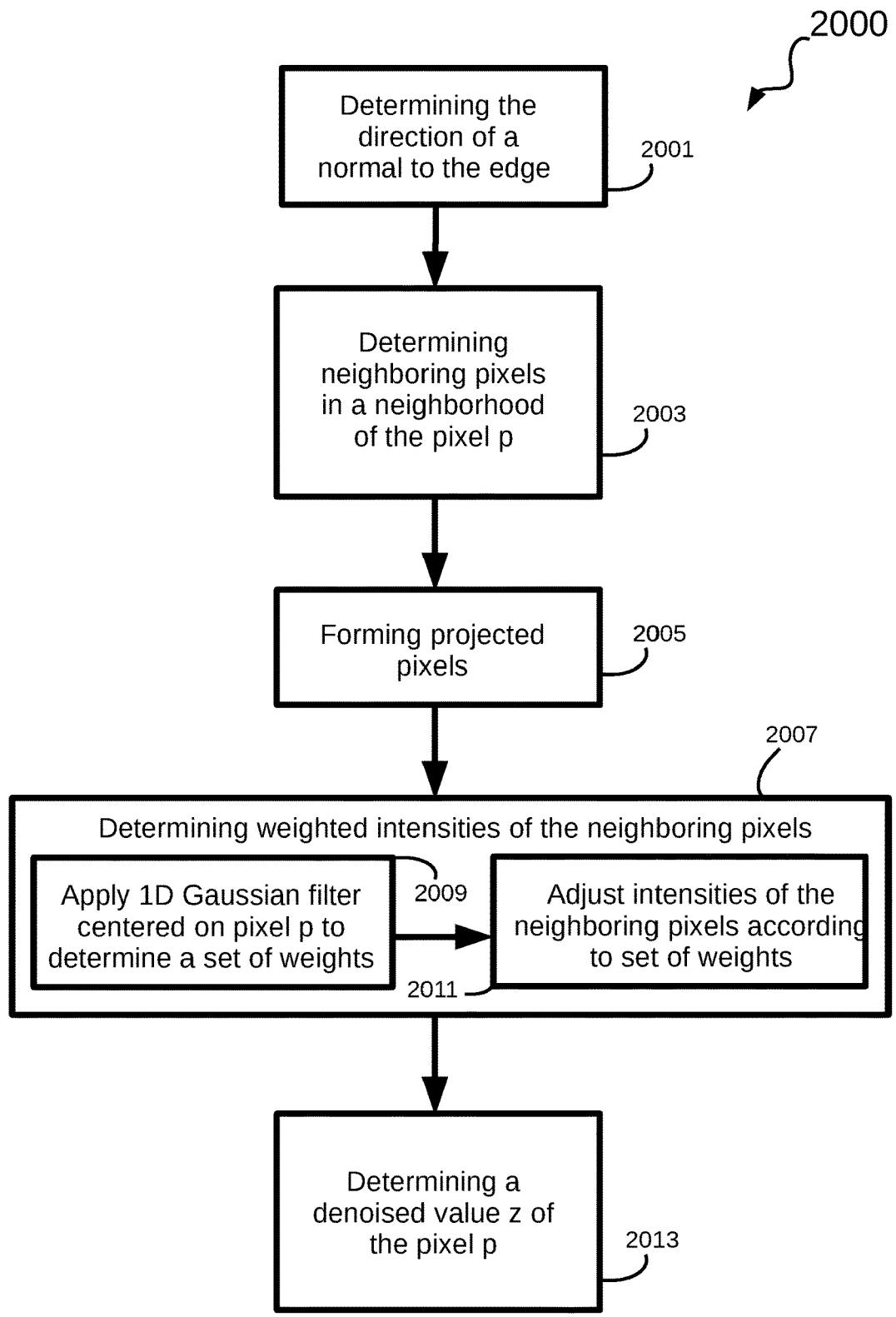
FIG. 11 is a flowchart illustrating a method of denoising an edge in a raw image according to another embodiment of the invention.

The corresponding method 2000 of denoising an edge in a raw image 104 is shown in FIG. 11, the edge comprising a pixel p, where a hardware processor 110 is employed for determining a direction of a normal to the edge 2001 near the pixel p. The next step in the method comprises determining neighboring pixels in a neighborhood of the pixel p 2003, then forming projected pixels 2005 by projecting the neighboring pixels to the normal to the edge. The next step 2007 is determining weighted intensities of the neighboring pixels, which includes two steps: determining a set of weights, comprising applying a one dimensional, 1D, Gaussian filter centered on the pixel p 2009 and acting on the projected pixels, and adjusting intensities of the neighboring pixels according to the set of weights 2011, and finally determining a denoised value z of the pixel p 2013 using the weighted intensities; thereby denoising the edge of the raw image expediently.

Figure 12:
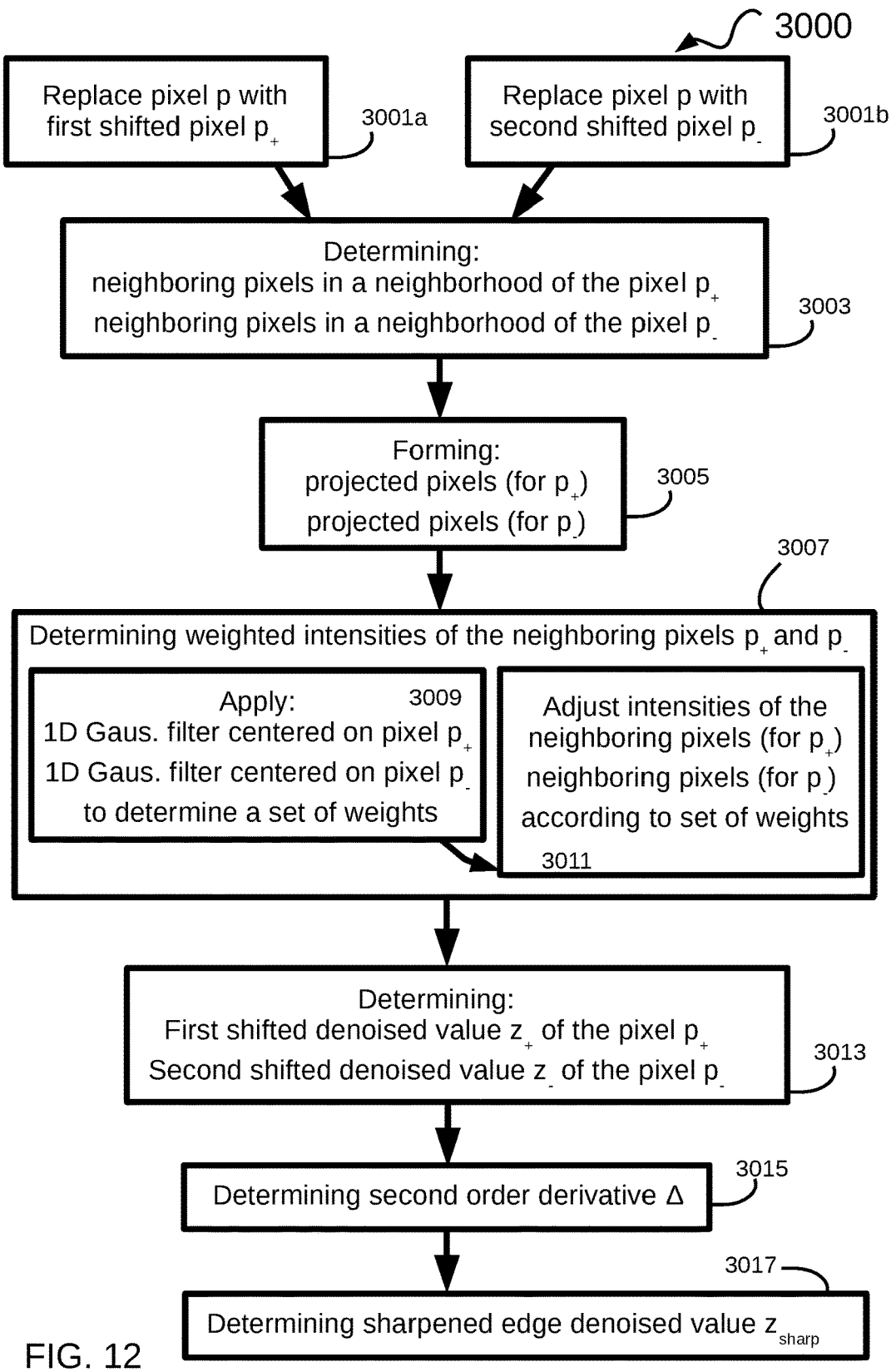
FIG. 12 is a flowchart illustrating additional steps of the method of denoising an edge in a raw image, as originally shown in FIG. 11.

The method 2000 shown in FIG. 11 has additional steps 3000, which are shown in FIG. 12. Replace the pixel p with respective first shifted pixel $p_+$ 3001a at a first distance from the pixel p along the normal to the edge, on a brighter side of the edge, and a second shifted pixel $p_-$ 3001b at a second distance from the pixel p along the normal to the edge, on a darker side of the edge. The next step in the method 3000 is determining neighboring pixels in a neighborhood of the pixel p+ and neighboring pixels in a neighborhood of the pixel p_3003, then forming projected pixels (for $p_-$) and forming projected pixels for ($p_+$) 3005 by projecting the neighboring pixels to the normal to the edge. The next step 3007 is determining weighted intensities of the neighboring pixels $p_+$ and $p_+$ 3007, which includes two steps: determining a set of weights, comprising applying a one dimensional, 1D, Gaussian filter centered on the pixel $p_+$, and applying a one dimensional, 1D, Gaussian filter centered on the pixel $p_+$ 3009 and acting on the projected pixels (for $p_+$ and for $p_-$), and adjusting intensities of the neighboring pixels (for $p_+$ and for $p_-$) according to the set of weights 3011. The next steps comprise determining a first shifted denoised value $z_+$ and a second shifted denoised value z_3013, determining a second order derivative $\Delta$ 3015 along the normal to the edge, based on the first and second shifted denoised values z_ and $z_+$ and a distance between the pixels $p_+$ and $p_-$, and finally determining a sharpened edge denoised value $z_{sharp}$ 3017 of the pixel p, comprising adjusting the denoised value z proportionately to the second order derivative $\Delta$.

Figure 14:
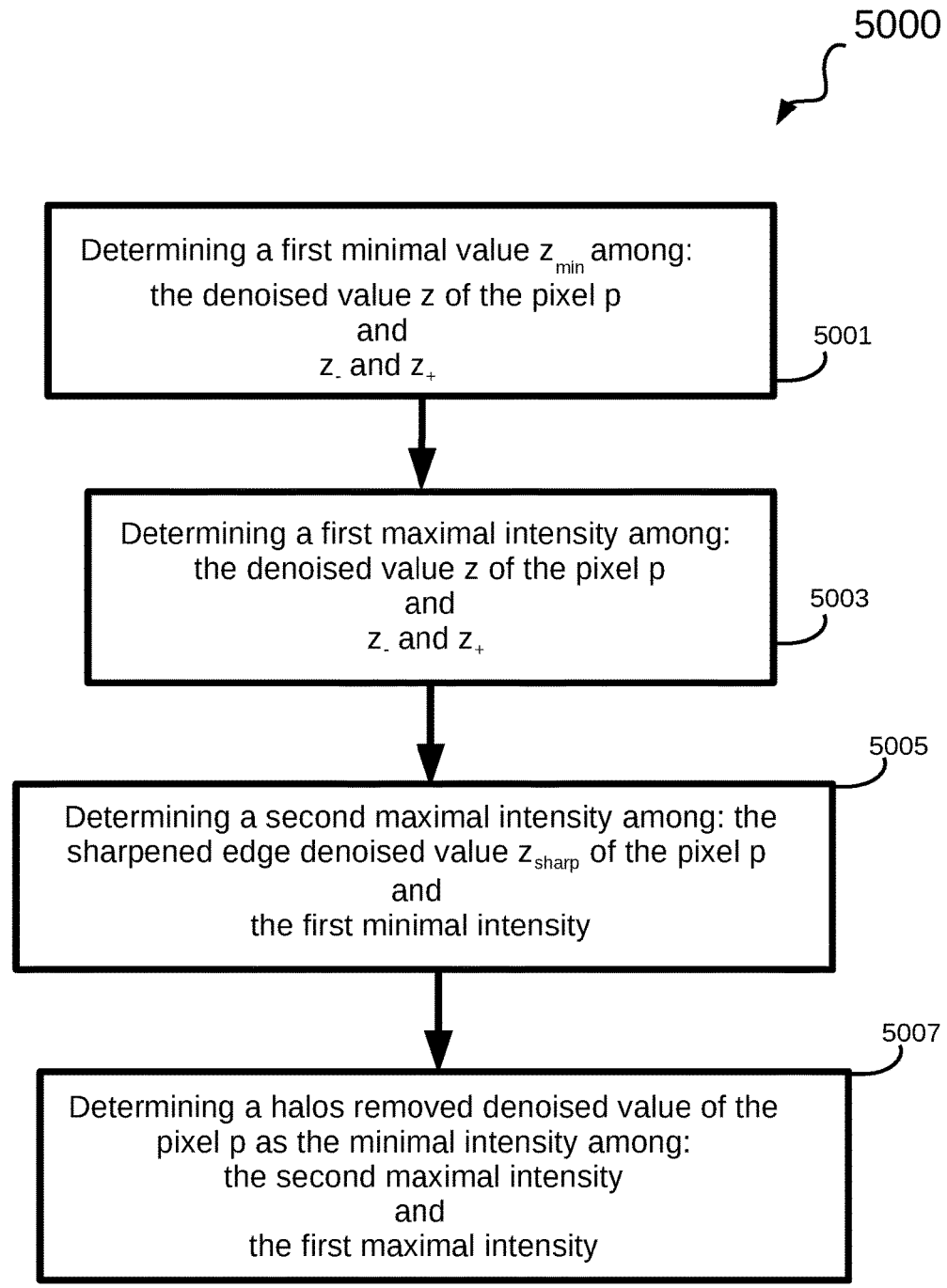
FIG. 14 is a flowchart illustrating additional steps of removing halos around the edge in the raw image of the method of denoising an edge in a raw image, as originally shown in FIG. 11.

The method 2000 shown in FIG. 11 has additional steps S000 for removing halos around the edge in the raw image, which are shown in FIG. 14. The additional steps comprise determining a first minimal value $z_{min}$ among the denoised value z of the pixel p and the shifted denoised values z_ and $z_+$ 5001, determining a first maximal value among the denoised value z of the pixel p and the shifted denoised values z_ and $z_+$ 5003. The next steps comprise determining a second maximal intensity among the sharpened edge denoised value $z_{sharp}$ of the pixel p and the first minimal intensity 5005. Finally, the steps comprise determining a halos removed denoised value of the pixel p as the minimal intensity among the second maximal intensity and the first maximal intensity 5007.

There is also another method for denoising a raw image. The first step of the method includes employing a hardware processor for a pixel p, then determining an approximation noise from an approximation part of the raw image, and then determining an edge noise from an edge of the raw image. The next step of the method includes determining a blending weight $w_b(p)$ as a function of $\alpha(p)$ and m(p), where $\alpha(p)$ is a variability of an angle in a direction of a normal to the edge near the pixel p and m(p) is a measure of a similarity between pixels in a neighborhood of the pixel p and a patch with a strong edge separating two flat areas. Finally, the next step is blending the approximation noise and the edge noise as a function of the blending weight $w_b(p)$, thereby expediently denoising the raw image.

6.0 Blending with the Result of the Texture Preserving Raw Image Denoiser

Figure 10:
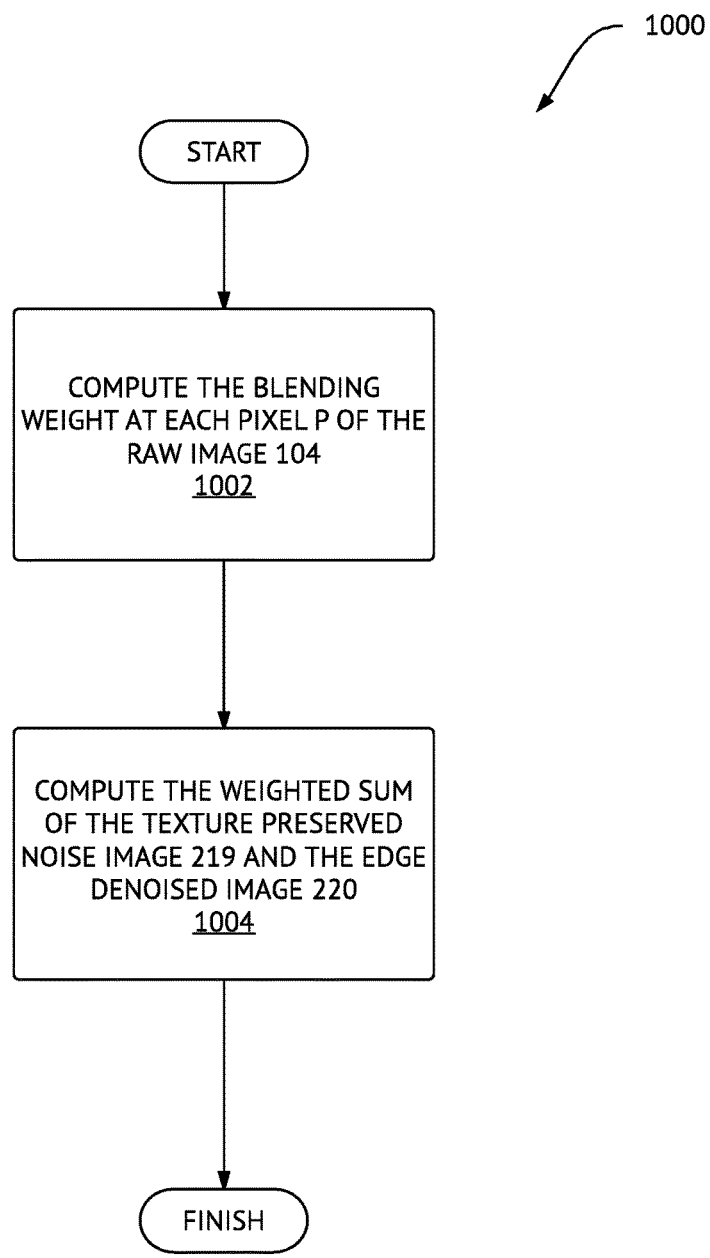
FIG. 10 is a flowchart illustrating a method for blending digital images according to another embodiment of the invention.

We now describe the Blending Module 222 shown in FIG. 2 with reference to the block diagram of Blending Module 222 in FIG. 9 and the flowchart 1000 of FIG. 10. The Blending Module 222 includes a Bending Weight Generator Module 902 for generating a Blending Weight 906 as described herein below. The Blending Module 222 further includes a Weighted Sum Module 904 for bending the Textured Preserved Denoised Image 219 and Edge Denoised Image 221 to provide the Denoised Image 108 as described herein below.

Using the Weighted Sum Module 904, the Denoised Image 108 is computed 1004 by the following:

$$\hat{I}(p) = w_b(p)\hat{I}(p) + (1 - w_b(p))\tilde{I}(p)$$

Wherein, $\hat{I}(p)$ is the Textured Preserved Denoised Image 219, $\tilde{I}(p)$ is the Edge Denoised Image 221, and the Denoised Image 108 is $\hat{I}(p)$. The Blending Weight 906, $w_b$, at each pixel p is computed 1004 he following way.

$$w_b(p) = (1 - sig(\alpha(p), \mu_a))(1 - sig(m(p), \mu_g))$$

wherein sig is the following sigmoid function:

$$sig(x, \mu) = 0.5\left(1 + \tanh\left(4\frac{x - \mu}{\min(|\mu|, \epsilon)}\right)\right)$$

where $\epsilon$ is a small value to avoid division by 0.

The constants $\mu_a$ and $\mu_g$ are parameters to tune to obtain best blending results. Typical values are $\mu_a \in [5, 15]$ and $\mu_g = 1.3$.

The function $\alpha(p)$ measures the variability in a small neighborhood of p of the direction of u, the normal to the edge, as estimated previously. If the estimate of the angle of the normal to the edge varies a lot in a small neighborhood (for instance, at some pixel p the normal to the edge is estimated as being horizontal, while at the next pixel the normal is estimated as being vertical), then this means the estimate is unreliable and it is most likely that there is actually no edge at all at the pixel p. As a result, a small weight is put to the output of the edge denoiser in the blending formula whenever $\alpha(p)$ is high, and a large weight is put whenever $\alpha(p)$ is low (i.e. close to zero).

The function m(p) measures how much the neighborhood of p is similar to a patch with a strong edge separating two flat areas. It does this by estimating the absolute value of the derivatives along many different directions and taking the minimum of those. Both $\alpha(p)$ and m(p) tend to be high when p is not close to an edge and are close to zero when p is close to a strong edge. This makes $w_b(p)$ close to 0 when p is not close to an edge and close to 1 when p is close to a strong edge if $\mu_a$ and $\mu_g$ are well chosen.

All values of $\mu_a$ and $\mu_g$ that make $w_b(p)$ verify the following property are "well chosen": whenever pixel p is close to a strong edge, $w_b(p)$ is close to 1, whenever pixel p is not close to an edge, $w_b(p)$ is close to 0. Examples of well chosen values are: $\mu_a$ in [5, 15] and $\mu_g = 1.3$.

However the values of $\mu_a$ and $\mu_g$ may be tuned to improve further blending results, by considering three extreme cases detailed below.

Case 1: The pixel p is on a strong vertical edge, with black pixels on the left, on a large area, and white pixels on the right, on a large area. There is no noise.

As an example, the intensities in a neighborhood of pixel p, in case 1, could be (with value of pixel p in bold):

$$\begin{bmatrix} 0 & 0 & 0 & 0.5 & 1 & 1 & 1 \\ 0 & 0 & 0 & 0.5 & 1 & 1 & 1 \\ 0 & 0 & 0 & 0.5 & 1 & 1 & 1 \\ 0 & 0 & 0 & \mathbf{0.5} & 1 & 1 & 1 \\ 0 & 0 & 0 & 0.5 & 1 & 1 & 1 \\ 0 & 0 & 0 & 0.5 & 1 & 1 & 1 \\ 0 & 0 & 0 & 0.5 & 1 & 1 & 1 \end{bmatrix}$$

In case 1, the angle to the normal vector to the edge is estimated robustly as 0 at pixel p and at its neighboring pixels, such that the variability $\alpha(p)$ is 0. The hyperbolic tangent (tan h) in sig(x,μ) will be close to -1, such that sig($\alpha$, $\mu_a$) will be close to 0.

m(p) is 0 as well. Consider that m(p) is the minimum of the absolute values of the derivatives of the pixel intensities along many different directions. Here the derivative along the y-axis is 0, so m(p) is 0. And therefore (1-sig(m(p), $\mu_g$)) will be close to 1. As a result, the blending weight $w_b(p)$ will be close to 1.

Case 2: The pixel p is on a large, mostly flat, area, pixel p is black and all pixels in a large neighborhood are black as well. There is a little noise.

As an example, the intensities in a neighborhood of pixel p, in case 2, could be (with value of pixel p in bold):

$$\begin{bmatrix} 0.05 & 0 & 0.04 & 0.01 & 0 & 0 & 0 \\ 0 & 0.01 & 0 & 0 & 0 & 0 & 0 \\ 0.01 & 0 & 0.03 & 0 & 0.01 & 0 & 0.01 \\ 0 & 0 & 0 & \mathbf{0.03} & 0 & 0 & 0 \\ 0.02 & 0.01 & 0.04 & 0.03 & 0 & 0 & 0.02 \\ 0 & 0 & 0 & 0.04 & 0 & 0 & 0 \\ 0 & 0 & 0 & 0.03 & 0.02 & 0.02 & 0.04 \end{bmatrix}$$

In case 2, it is impossible to estimate robustly any normal vector to the edge at all. Instead, the angle that is estimated for the normal vector to the edge is random, since there isn't any edge but only noisy values. So the variability $\alpha(p)$ will be high, and therefore (1-sig($\alpha$, $\mu_a$)) will be close to 0. As a result, $w_b(p)$ will be close to 0.

Case 3: The pixel p is on the corner of an object, with black pixels on the left and on the top, while pixels at the bottom right are white. There is no noise.

As an example, the intensities in a neighborhood of pixel p, in case 3, could be (with value of pixel p in bold):

$$\begin{bmatrix} 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & \mathbf{0.5} & 0.5 & 0.5 & 0.5 \\ 0 & 0 & 0 & 0.5 & 1 & 1 & 1 \\ 0 & 0 & 0 & 0.5 & 1 & 1 & 1 \\ 0 & 0 & 0 & 0.5 & 1 & 1 & 1 \end{bmatrix}$$

In case 3, $w_b(p)$ must be low because the edge denoiser won't be effective. Here, the angle to the normal vector will be consistently estimated (around 135 degrees) and the variability $\alpha(p)$ will be close to zero, as a result (1-sig($\alpha$, $\mu_a$)) will be close to 1. On the other hand, m(p) will be high, because the gradient along any direction is significant in a least one pixel in the neighborhood of p. Therefore, (1-sig(m(p), $\mu_g$)) will be close to 0. As a result, $w_b(p)$ will be close to 0.

We now give details about how to compute $\alpha(p)$ and m(p).

6.1. Computation of $\alpha(p)$

We introduce the following notations: $N(p) = \{p + (x, y); x, y \in \{-2, 0, 2\}\}$ a neighborhood of p that includes p and 8 other nearby pixels of the same Bayer channel, and $\theta(p) = $ angle(u) the angle of the normal to the edge at p. For $q, q' \in N(p)$ we define $\delta(q, q') = (\theta(q) - \theta(q')) \equiv \pi$ where the symbol $\equiv$ means modulo. Then $$\alpha(p) = \frac{180}{\pi} \min_{q,q' \in N(p)} \alpha(q, q')$$

where $\alpha(q,q')=\min(\delta(q,q'), \pi-\delta(q,q'))$. The scaling by $$\frac{180}{\pi}$$

is optional, it is useful to be able to express $\mu_a$ in degrees.

6.2. Computation of m(p)

We present two methods to compute m(p). The first method is based on filters with small support which is advantageous when using line buffer architectures, but that method can become inaccurate in case of very sharp images. For such cases we present a second method based on filters with larger support.

6.2.1. Method 1: Small Support Filters

We first define $g_x$ and $g_y$ as the convolutions of the input raw image I with kernels $k_x=(-1\ 0\ 1)$ and $k_y=k_x^T$ respectively. Then for any $\theta \in [0,\pi]$ and pixel p in the image, we define $g(p,\theta)=|g_x(p)\cos\theta+g_y(p)\sin\theta|$ and $$\bar{g}(p, \theta) = \frac{1}{|B(p)|} \sum_{q \in B(p)} g(q, \theta)$$

where B(p) is a neighborhood of p, for instance all pixels in a patch of M by M pixels centered at p. Then m(p) is defined as follows:

$$m(p) = \min_{k \in \{1,\ldots,N\}} \bar{g}\left(p, \frac{k}{N}\pi\right)$$

where N is chosen such as making the filter effective enough at measuring the similarity of the patch with a strong edge, while still being acceptable in terms of amount of computation.

6.2.2. Method 2: Large Support Filters

We first define a collection of 16 filters $K=\{k_i; i \in \{1, \ldots, 16\}\}$ as follows.

$$k_1 = (-1\ 0\ 1), k_2 = k_1^T, k_3 = \begin{pmatrix} -1 & 0 & 0 \\ 0 & 0 & 0 \\ 0 & 0 & 1 \end{pmatrix}, k_4 = \begin{pmatrix} 0 & 0 & 1 \\ 0 & 0 & 0 \\ -1 & 0 & 0 \end{pmatrix}$$

$$k_5 = \begin{pmatrix} -1 & 0 & 0 & 0 & 0 \\ 0 & 0 & 0 & 0 & 0 \\ 0 & 0 & 0 & 0 & 1 \end{pmatrix}, k_6 = k_5^T,$$

$$k_7 = \begin{pmatrix} 0 & 0 & 0 & 0 & 1 \\ 0 & 0 & 0 & 0 & 0 \\ -1 & 0 & 0 & 0 & 0 \end{pmatrix}, k_8 = k_7^T$$

$$k_9 = 0.25 \begin{pmatrix} -3 & 0 & 0 & 0 & 1 \\ 0 & 0 & 0 & 0 & 0 \\ -1 & 0 & 0 & 0 & 3 \end{pmatrix}, k_{10} = k_9^T,$$

$$k_{11} = 0.25 \begin{pmatrix} -1 & 0 & 0 & 0 & 3 \\ 0 & 0 & 0 & 0 & 0 \\ -3 & 0 & 0 & 0 & 1 \end{pmatrix}, k_{12} = k_{11}^T$$

$$k_{13} = 0.25 \begin{pmatrix} -3 & 0 & -1 & 0 & 0 \\ 0 & 0 & 0 & 0 & 0 \\ 0 & 0 & 0 & 0 & 0 \\ 0 & 0 & 0 & 0 & 0 \\ 0 & 0 & 1 & 0 & 3 \end{pmatrix}, k_{14} = k_{13}^T,$$

$$k_{15} = 0.25 \begin{pmatrix} 0 & 0 & -1 & 0 & -3 \\ 0 & 0 & 0 & 0 & 0 \\ 0 & 0 & 0 & 0 & 0 \\ 0 & 0 & 0 & 0 & 0 \\ 3 & 0 & 1 & 0 & 0 \end{pmatrix}, k_{16} = k_{15}^T.$$

Then for each $k \in K$ we define $g_k$ as the convolution of the input raw image I with kernel k, and $$\bar{g}_k(p) = \frac{1}{|B(p)|} \sum_{q \in B(p)} |g_k(q)|$$

where B(p) is a neighborhood of p as previously. Then m(p) is defined as follows:

$$m(p) = \min_{k \in K} \bar{g}_k(p).$$

6.3 Method for Blending

Figure 15:
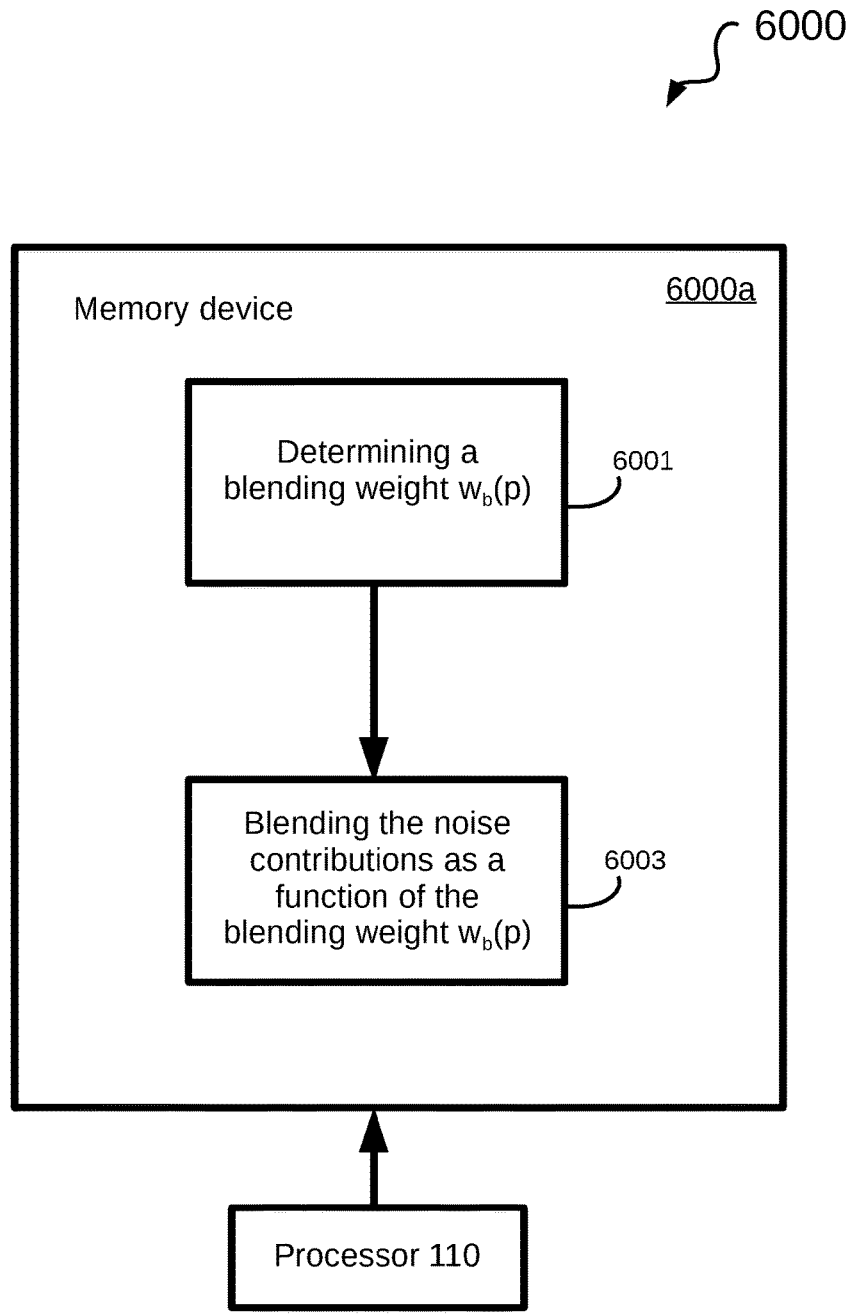
FIG. 15 is a flowchart illustrating a method for blending an approximation noise and an edge noise for a pixel p from an approximation part and an edge of a raw image according to another embodiment of the invention.

The corresponding method 6000 for blending an approximation noise and an edge noise for a pixel p from an approximation part and an edge of a raw image respectively, is shown in FIG. 15. The method 6000 comprises a memory device having computer readable instructions stored thereon 6000a for execution by a hardware processor 110, for determining a blending weight $w_b(p)$ 6001 for blending the approximation noise and the edge noise as a function of $\alpha(p)$ and m(p), where $\alpha(p)$ is a variability of an angle measure in a direction of a normal to the edge near the pixel p, and m(p) is a measure of a similarity between pixels in a neighborhood of the pixel p and a patch with a strong edge separating two flat areas. The next step in the method 6000 comprises blending the approximation noise and the edge noise as a function of the blending weight $w_b(p)$ 6003, thereby expediently denoising the raw image.

There is also another method for blending noise contributions from an approximation part and an edge of a raw image. The first step of the method includes employing a hardware processor for a pixel p, and determining an approximation noise from the approximation part of the raw image, then determining an edge noise from the edge of the raw image, then determining a blending weight $w_b(p)$ as a function of $\alpha(p)$ and m(p), where $\alpha(p)$ is a variability of an angle in a direction of a normal to the edge near the pixel p and m(p) is a measure of a similarity between pixels in a neighborhood of the pixel p and a patch with a strong edge separating two flat areas. Finally, the next step of the method includes blending the approximation noise and the edge noise as a function of the blending weight $w_b(p)$, thereby expediently denoising the raw image.

Figure 13:
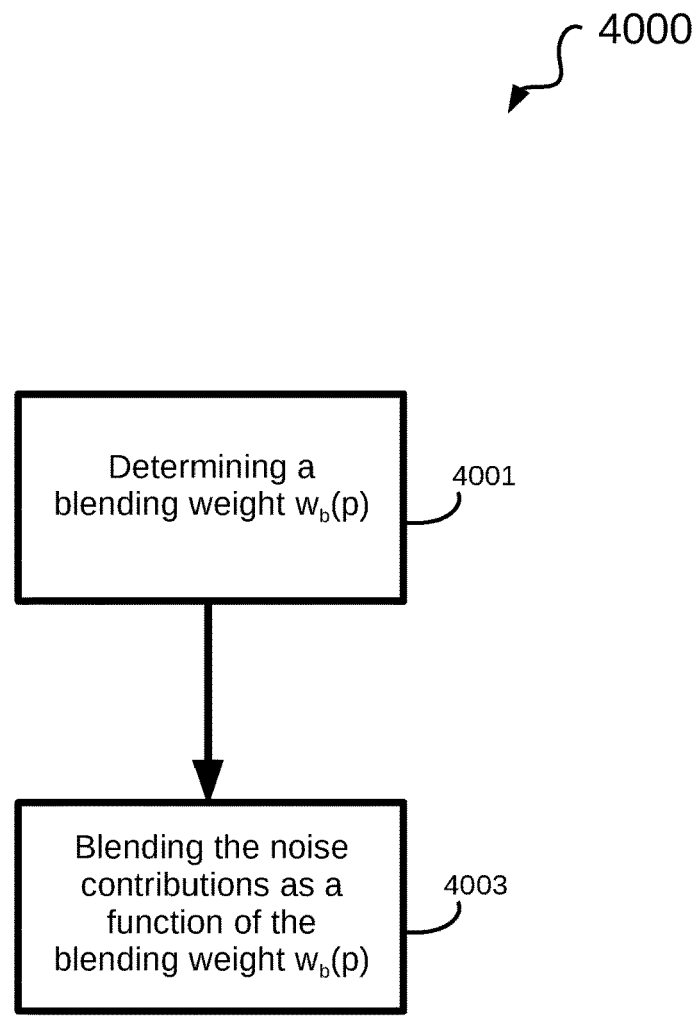
FIG. 13 is a flowchart illustrating additional steps of blending noise contributions from an approximation part and an edge of raw image of the method of denoising an edge in a raw image, as originally shown in FIG. 11.

The method 2000 of denoising an edge in a raw image 104 that is shown in FIG. 11 may also have additional steps 4000 for blending noise contributions from an approximation part and an edge of the raw image, which are shown in FIG. 13.

The additional steps comprise determining a blending weight $w_b(p)$ 4001 as a function of $\alpha(p)$ and $m(p)$, where $\alpha(p)$ is a variability of an angle in a direction of a normal to the edge near the pixel p, m(p) is a measure of a similarity between pixels in a neighborhood of the pixel p and a patch with a strong edge separating two flat areas. Finally, the method comprises blending the noise contributions as a function of the blending weight $w_b(p)$ 4003 thereby expediently denoising the raw image.

7.0 Modifications/Variations

The systems 100 and 400 of the embodiments of the invention, comprising all modules and devices as described with regard to FIG. 1, FIG. 2, FIG. 4 and FIG. 5 include memory devices having computer readable instructions stored therein, for execution by at least one hardware processor (processor).

It should be noted that image input data and image output data of the system and method of the embodiments of the present invention described herein are not, in any sense, abstract or intangible.

Instead, the data is necessarily digitally encoded and stored in a physical data-storage computer-readable non-transitory storage medium, such as an electronic memory, mass-storage device, or other physical, tangible, data-storage device and medium.

It should also be noted that the currently described data-processing and data-storage methods cannot be carried out manually by a human analyst, because of the complexity and vast numbers of intermediate results generated for processing and analysis of even quite modest amounts of data.

Instead, the methods described herein are necessarily carried out by electronic computing systems on electronically or magnetically stored data, with the results of the data processing and data analysis digitally encoded and stored in one or more tangible, physical, data-storage devices and media.

In the method and system for denoising of a digital image, a bilateral filter, which does not use a guide but instead uses the image itself for computing the weights, may be used instead of non local means filter. However, the bilateral filter usually yields inferior results compared with the non local means filter for denoising applications.

The raw image format of the embodiments of the invention has been acquired using a Bayer's filter, however it is understood that any other raw image format of existing manufacturers of digital equipment may be also used, such as CYGM (cyan, yellow, green, magenta) filter, RGBE (red, green, blue, emerald) filter, panchromatic cell filters of various configurations, including CMYW (cyan, magenta, yellow, and white) filter, RGBW (red, green, blue, white) filter and other panchromatic filters; Fuji film "EXR" color filter array, Fuji film "X-Trans" color filter or else.

Although a single hardware processor 102 has been shown in FIG. 1 and a single hardware processor has been shown in FIG. 4, it is understood that the processing of images according to the embodiments of the present invention may be performed by multiple processors or cores, either sequentially or in parallel. Also certain parts of the processing or the entire processing may be done in a cloud, if required.

The method for demosaic artifact suppression of the present invention may be generalized for images with arbitrary set of channels, for instance: red, green, blue, and infrared. To do so, we need to perform the weighted average for each of the considered channels in the set of channels, as we presented for the R, G, and B channels above.

The method for demosaic artifact suppression of the present invention may be also be generalized for other color filter array (CFA) patterns. For example, the vector $Z(p)$ at pixel p may be computed in the following way. On each sub-set of pixels that has the same shape as the CFA pattern and that contains the pixel p, we compute the average luminance on that set. Those averages form the components of the vector $Z(p)$.

Methods of the embodiment of the invention may be performed using one or more hardware processors, executing processor-executable instructions causing the hardware processors to implement the processes described above. Computer executable instructions may be stored in processor-readable storage media such as floppy disks, hard disks, optical disks, Flash ROMs (read only memories), non-volatile ROM, and RAM (random access memory). A variety of processors, such as microprocessors, digital signal processors, and gate arrays, may be employed.

Systems of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the methods of this disclosure.

It should be noted that methods and systems of the embodiments of the invention and data streams described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method of denoising an edge in a raw image, the edge comprising a pixel p, the method comprising:
   employing a hardware processor for:
   (a) determining a direction of a normal to the edge near the pixel p;
   (b) determining neighboring pixels in a neighborhood of the pixel p;
   (c) projecting the neighboring pixels to the normal to the edge, forming projected pixels;

(d) determining weighted intensities of the neighboring pixels, comprising:
   (i) determining a set of weights, comprising applying a one dimensional, 1D, Gaussian filter centered on the pixel p and acting on the projected pixels; and
   (ii) adjusting intensities of the neighboring pixels according to the set of weights; and
(e) determining a denoised value z of the pixel p using the weighted intensities;

thereby denoising the edge of the raw image expediently.

2. The method of claim 1, further comprising:
replacing the pixel p with respective first shifted pixel $p_+$ at a first distance from the pixel p along the normal to the edge, on a brighter side of the edge, and a second shifted pixel $p_-$ at a second distance from the pixel p along the normal to the edge, on a darker side of the edge;
applying the steps (b) to (e) to the respective pixels $p_+$ and $p_-$ to determine a first shifted denoised value $z_+$ and a second shifted denoised value $z_-$;
determining a second order derivative $\Delta$ along the normal to the edge, based on the first and second shifted denoised values $z_-$ and $z_+$ and a distance between the pixels $p_+$ and $p_-$;
determining a sharpened edge denoised value $z_{sharp}$ of the pixel p, comprising adjusting the denoised value z proportionately to the second order derivative $\Delta$.

3. The method of claim 2, wherein the first distance from the pixel p and the second distance from the pixel p are substantially equal.

4. The method of claim 2, wherein a sharpened edge denoised value $z_{sharp}$ is determined as $z_{sharp}=z+s\,\Delta$, wherein "s" is a predefined strength of sharpening.

5. The method of claim 4, wherein "s" is about 0.6.

6. The method of claim 1, wherein the determining the direction of the normal to the edge further comprises:
applying a set of linear filters $K_x$, $K_y$, $K_z$, and $K_w$ to the raw image, the filters being balanced, resulting in a set of filtered images $d_x$, $d_y$, $d_z$, $d_w$, respectively;
generating a set of estimates of the normal to the edge, based on the set of respective filtered images $d_x$, $d_y$, $d_z$, $d_w$; and
generating the normal to the edge using the set of filtered images.

7. The method of claim 6, wherein the applying further comprises choosing a size of each linear filter from about 3 to about 9.

8. The method of claim 2, wherein the applying comprises applying the set of linear filters $K_x$, $K_y$, $K_z$, $K_w$ as follows:

$$K_x = \begin{bmatrix} -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & 0 & -1 & 0 & 0 & 0 & 1 & 0 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \end{bmatrix}$$

$$K_y = \begin{bmatrix} -1 & -1 & -1 & -1 & -1 & -1 & -1 & -1 & -1 \\ -1 & -1 & -1 & -1 & 0 & -1 & -1 & -1 & -1 \\ -1 & -1 & -1 & -1 & -1 & -1 & -1 & -1 & -1 \\ -1 & -1 & -1 & -1 & 0 & -1 & -1 & -1 & -1 \\ 0 & 0 & 0 & 0 & 0 & 0 & 0 & 0 & 0 \\ 1 & 1 & 1 & 1 & 0 & 1 & 1 & 1 & 1 \\ 1 & 1 & 1 & 1 & 1 & 1 & 1 & 1 & 1 \\ 1 & 1 & 1 & 1 & 0 & 1 & 1 & 1 & 1 \\ 1 & 1 & 1 & 1 & 1 & 1 & 1 & 1 & 1 \end{bmatrix}$$

$$K_z = \begin{bmatrix} 0 & 1 & 1 & 1 & 1 & 1 & 1 & 1 & 1 \\ -1 & 0 & 1 & 1 & 1 & 1 & 1 & 1 & 1 \\ -1 & -1 & 0 & 1 & 1 & 1 & 1 & 1 & 1 \\ -1 & -1 & -1 & 0 & 1 & 1 & 1 & 1 & 1 \\ -1 & -1 & -1 & -1 & 0 & 1 & 1 & 1 & 1 \\ -1 & -1 & -1 & -1 & -1 & 0 & 1 & 1 & 1 \\ -1 & -1 & -1 & -1 & -1 & -1 & 0 & 1 & 1 \\ -1 & -1 & -1 & -1 & -1 & -1 & -1 & 0 & 1 \\ -1 & -1 & -1 & -1 & -1 & -1 & -1 & -1 & 0 \end{bmatrix}$$

$$K_w = \begin{bmatrix} -1 & -1 & -1 & -1 & -1 & -1 & -1 & -1 & 0 \\ -1 & -1 & -1 & -1 & -1 & -1 & -1 & 0 & 1 \\ -1 & -1 & -1 & -1 & -1 & -1 & 0 & 1 & 1 \\ -1 & -1 & -1 & -1 & -1 & 0 & 1 & 1 & 1 \\ -1 & -1 & -1 & -1 & 0 & 1 & 1 & 1 & 1 \\ -1 & -1 & -1 & 0 & 1 & 1 & 1 & 1 & 1 \\ -1 & -1 & 0 & 1 & 1 & 1 & 1 & 1 & 1 \\ -1 & 0 & 1 & 1 & 1 & 1 & 1 & 1 & 1 \\ 0 & 1 & 1 & 1 & 1 & 1 & 1 & 1 & 1 \end{bmatrix}.$$

9. The method of claim 1, further comprising selecting the neighborhood of the pixel p having a rectangular shape.

10. The method of claim 1, further comprising choosing a standard deviation for the 1D Gaussian filter from about 1.5 to about 2.

11. A system for denoising an edge in a raw image, the edge comprising a pixel p, the system comprising:
a memory device having computer readable instructions stored thereon for execution by a processor, causing the processor to:
(a) determine a direction of a normal to the edge;
(b) determine neighboring pixels in a neighborhood of the pixel p;
(c) project the neighboring pixels to the normal to the edge, forming projected pixels;
(d) determine weighted intensities of the neighboring pixels, comprising:
   (i) determining a set of weights, comprising applying a one dimensional, 1D, Gaussian filter centered on the pixel p and acting on the projected pixels; and
   (ii) adjusting intensities of the neighboring pixels according to the set of weights; and
(e) determine a denoised value z of the pixel p using the weighted intensities;

thereby denoising the edge of the raw image expediently.

12. The system of claim 11, wherein the computer readable instructions further cause the processor to:
replace the pixel p with respective first shifted pixel $p_+$ at a first distance from the pixel p along the normal to the edge, on a brighter side of the edge, and a second shifted pixel p− at a second distance from the pixel p along the normal to the edge, on a darker side of the edge;

apply the steps (b) to (e) to the respective pixels $p_+$ and $p_-$ to determine a first shifted denoised value $z_+$ and a second shifted denoised value $z_-$;

determine a second order derivative Δ along the normal to the edge, based on the first and second shifted denoised values $z_-$ and $z_+$ and a distance between the pixels $p_+$ and $p_-$;

determine a sharpened edge denoised value $z_{sharp}$ of the pixel p, comprising adjusting the denoised value z proportionately to the second order derivative Δ.

13. The system of claim 12, wherein the first distance from the pixel p and the second distance from the pixel p are substantially equal.

14. The system of claim 12, wherein the computer readable instructions further cause the processor to determine a sharpened edge denoised value as: $z_{sharp}=z+s\,\Delta$, wherein "s" is a predefined strength of sharpening.

15. The system of claim 14, wherein "s" is about 0.6.

16. The system of claim 11, wherein the computer readable instructions for determining the direction of the normal to the edge, further cause the processor to:

apply a set of linear filters $K_x$, $K_y$, $K_z$, and $K_w$ to the raw image, the filters being balanced, resulting in a set of filtered images $d_x$, $d_y$, $d_z$, $d_w$, respectively;

generate a set of estimates of the normal to the edge, based on the set of respective filtered images $d_x$, $d_y$, $d_z$, $d_w$; and generate the normal to the edge using the set of filtered images.

17. The system of claim 16, wherein a size of each linear filters is from about 3 to about 9.

18. The system of claim 12, wherein the set of linear filters $K_x$, $K_y$, $K_z$, $K_w$ are as follows:

$$K_x = \begin{bmatrix} -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & 0 & -1 & 0 & 0 & 0 & 1 & 0 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \end{bmatrix}$$

$$K_y = \begin{bmatrix} -1 & -1 & -1 & -1 & -1 & -1 & -1 & -1 & -1 \\ -1 & -1 & -1 & -1 & 0 & -1 & -1 & -1 & -1 \\ -1 & -1 & -1 & -1 & -1 & -1 & -1 & -1 & -1 \\ -1 & -1 & -1 & -1 & 0 & -1 & -1 & -1 & -1 \\ 0 & 0 & 0 & 0 & 0 & 0 & 0 & 0 & 0 \\ 1 & 1 & 1 & 1 & 0 & 1 & 1 & 1 & 1 \\ 1 & 1 & 1 & 1 & 1 & 1 & 1 & 1 & 1 \\ 1 & 1 & 1 & 1 & 0 & 1 & 1 & 1 & 1 \\ 1 & 1 & 1 & 1 & 1 & 1 & 1 & 1 & 1 \end{bmatrix}$$

$$K_z = \begin{bmatrix} 0 & 1 & 1 & 1 & 1 & 1 & 1 & 1 & 1 \\ -1 & 0 & 1 & 1 & 1 & 1 & 1 & 1 & 1 \\ -1 & -1 & 0 & 1 & 1 & 1 & 1 & 1 & 1 \\ -1 & -1 & -1 & 0 & 1 & 1 & 1 & 1 & 1 \\ -1 & -1 & -1 & -1 & 0 & 1 & 1 & 1 & 1 \\ -1 & -1 & -1 & -1 & -1 & 0 & 1 & 1 & 1 \\ -1 & -1 & -1 & -1 & -1 & -1 & 0 & 1 & 1 \\ -1 & -1 & -1 & -1 & -1 & -1 & -1 & 0 & 1 \\ -1 & -1 & -1 & -1 & -1 & -1 & -1 & -1 & 0 \end{bmatrix}$$

$$K_w = \begin{bmatrix} -1 & -1 & -1 & -1 & -1 & -1 & -1 & -1 & 0 \\ -1 & -1 & -1 & -1 & -1 & -1 & -1 & 0 & 1 \\ -1 & -1 & -1 & -1 & -1 & -1 & 0 & 1 & 1 \\ -1 & -1 & -1 & -1 & -1 & 0 & 1 & 1 & 1 \\ -1 & -1 & -1 & -1 & 0 & 1 & 1 & 1 & 1 \\ -1 & -1 & -1 & 0 & 1 & 1 & 1 & 1 & 1 \\ -1 & -1 & 0 & 1 & 1 & 1 & 1 & 1 & 1 \\ -1 & 0 & 1 & 1 & 1 & 1 & 1 & 1 & 1 \\ 0 & 1 & 1 & 1 & 1 & 1 & 1 & 1 & 1 \end{bmatrix}.$$

19. The system of claim 11, wherein the neighborhood of the pixel p has a rectangular shape.

20. The system of claim 11, wherein a standard deviation for the 1D Gaussian filter is from about 1.5 to about 2.

21. The method of claim 1, further comprising blending noise contributions from an approximation part and an edge of the raw image, comprising:
(f) determining a blending weight $w_b(p)$ as a function of α(p) and m(p), wherein:
  (i) α(p) is a variability of an angle in a direction of a normal to the edge near the pixel p; and
  (ii) m(p) is a measure of a similarity between pixels in a neighborhood of the pixel p and a patch with a strong edge separating two flat areas; and
(g) blending the noise contributions as a function of the blending weight $w_b(p)$, thereby expediently denoising the raw image.

22. The method of claim 1, further comprising removing halos around the edge in the raw image, wherein:
(a) determining a first minimal value $z_{min}$ among the denoised value z of the pixel p and the shifted denoised values $z_-$ and $z_+$;
(b) determining a first maximal intensity among the denoised value z of the pixel p and the shifted denoised values $z_-$ and $z_+$;
(c) determining a second maximal intensity among the sharpened edge denoised value $z_{sharp}$ of the pixel p and the first minimal intensity;
(d) determining a halos removed denoised value of the pixel p as the minimal intensity among the second maximal intensity and the first maximal intensity.

23. A method for blending an approximation noise and an edge noise for a pixel p from an approximation part and an edge of a raw image respectively, the method comprising: employing a hardware processor for:
(a) determining a blending weight $w_b(p)$ for blending the approximation noise and the edge noise as a function of α(p) and m(p), comprising:
  (i) determining α(p) as a variability of an angle measure in a direction of a normal to the edge near the pixel p; and (ii) determining m(p) as a measure of a similarity between pixels in a neighborhood of the pixel p and a patch with a strong edge separating two flat areas; and
(b) blending the approximation noise and the edge noise as a function of the blending weight $w_b(p)$, thereby expediently denoising the raw image.

* * * * *